United States Patent
Yokomizo et al.

(10) Patent No.: US 9,829,943 B2
(45) Date of Patent: Nov. 28, 2017

(54) REMOTE MONITORING METHOD, REMOTE MONITORING SYSTEM, FIRST COMMUNICATION APPARATUS, SECOND COMMUNICATION APPARATUS AND SERVER APPARATUS

(71) Applicant: Panasonic Intellectual Property Management Co., Ltd., Osaka (JP)

(72) Inventors: Yasushi Yokomizo, Tokyo (JP); Hitomaro Tougou, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 423 days.

(21) Appl. No.: 14/601,619

(22) Filed: Jan. 21, 2015

(65) Prior Publication Data
US 2016/0209896 A1 Jul. 21, 2016

(51) Int. Cl.
| | |
|---|---|
| *G05B 11/01* | (2006.01) |
| *G06F 1/26* | (2006.01) |
| *G05B 15/02* | (2006.01) |
| *H04W 4/00* | (2009.01) |
| *F24F 11/00* | (2006.01) |

(52) U.S. Cl.
CPC ............ *G06F 1/26* (2013.01); *G05B 15/02* (2013.01); *H04W 4/005* (2013.01); *F24F 2011/0068* (2013.01); *F24F 2011/0091* (2013.01)

(58) Field of Classification Search
None
See application file for complete search history.

(56) References Cited

U.S. PATENT DOCUMENTS

| | | | | |
|---|---|---|---|---|
| 2010/0049639 | A1* | 2/2010 | Ferro | G06Q 10/06 705/34 |
| 2013/0138542 | A1* | 5/2013 | Sirton | G06Q 10/0631 705/34 |
| 2013/0346166 | A1* | 12/2013 | Chihara | G07B 15/02 705/13 |

(Continued)

FOREIGN PATENT DOCUMENTS

| | | |
|---|---|---|
| JP | 2005-020272 | 1/2005 |
| JP | 2006-344144 | 12/2006 |
| JP | 2007-110358 | 4/2007 |

*Primary Examiner* — Diem Cao
(74) *Attorney, Agent, or Firm* — Greenblum & Bernstein, P.L.C.

(57) ABSTRACT

A remote monitoring method is provided for a remote monitoring system including a first communicator connected to a server that performs a charging process depending on a state of a power supply of an electrical apparatus and a second communicator connected to the first communicator via a wireless communication network and that monitors the state of the power supply of the electrical apparatus. When the second communicator detects turning-off of the electric power of the electrical apparatus, the second communicator transmits on-information indicating the change in the state to the first communicator via the wireless communication network, and maintains the electrical apparatus in the on-state as long as the wireless communication continues. However, if an occurrence of an interruption of the wireless communication is detected, the second communicator turns off the electric power of the electrical apparatus.

17 Claims, 17 Drawing Sheets

(56) References Cited

U.S. PATENT DOCUMENTS

| | | | |
|---|---|---|---|
| 2015/0212500 A1* | 7/2015 | Akabane | G05D 1/0274 |
| | | | 700/275 |
| 2015/0220416 A1* | 8/2015 | Johnson | G06F 11/3041 |
| | | | 710/19 |
| 2016/0006264 A1* | 1/2016 | Alperin | H02J 5/005 |
| | | | 307/104 |
| 2016/0099602 A1* | 4/2016 | Leabman | H02J 7/025 |
| | | | 307/104 |
| 2016/0276873 A1* | 9/2016 | Ben Hanoch | H02J 50/12 |

* cited by examiner

| USER ID | PASSWORD | ELECTRIC APPARATUS IDENTIFICATION INFORMATION | ELECTRICITY BILL | OPERATION TIME | REMAINING AMOUT |
|---|---|---|---|---|---|
| 001 | PAS001 | AC001 | ¥3,200 | 2 HOURS 15 MINUTES 30 SECONDS | ¥1,800 |
| 002 | PAS002 | AC002 | ¥5,700 | 3 HOURS 50 MINUTES 15 SECONDS | ¥4,300 |
| ⋮ | ⋮ | ⋮ | ⋮ | ⋮ | ⋮ |

REMOTE MONITORING METHOD, REMOTE MONITORING SYSTEM, FIRST COMMUNICATION APPARATUS, SECOND COMMUNICATION APPARATUS AND SERVER APPARATUS

BACKGROUND

1. Technical Field

The present disclosure relates to a technique of charging depending on a state in which an electrical apparatus is used.

2. Description of the Related Art

In a charging system in which charging is performed depending on operating time or electric energy consumed by using an electrical apparatus such as a television set, a refrigerator, an air conditioner, or the like it is known to perform charging using a prepaid card (for example, see Japanese Unexamined Patent Application Publication No. 2006-344144).

However, in the charging system using the prepaid card, some cost is required to produce, manage, and sell the prepaid card. Besides, to use an electrical apparatus, a user has to purchase a prepaid card and carry the prepaid card, which is troublesome for the user. Furthermore, there is a possibility that an electrical apparatus is used fraudulently by using a forged or copied prepaid card.

In view of the above, one non-limiting and exemplary embodiment provides a remote monitoring method that allows it to perform charging depending on use of an electrical apparatus of a user without using a prepaid card in a manner that suppresses a possibility that the electrical apparatus is used fraudulently without payment. Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

SUMMARY

The present disclosure provides a remote monitoring method in a remote monitoring system including a first communicator connected to a server that performs a charging process depending on a state of a power supply of an electrical apparatus and a second communicator connected to the first communicator via a wireless communication network and that monitors the state of the power supply of the electrical apparatus, the remote monitoring method including, making the server start the charging process associated with a user of the electrical apparatus by the first communicator in a case where the first communicator receives on-information, indicating the occurrence of a change of the electric power of the electrical apparatus from an off-state to an on-state, from the second communicator via the wireless communication network, making the server end the charging process by the first communicator in a case where after the first communicator makes the server start the charging process, the first communicator detects an occurrence of an interruption of the wireless communication between the first communicator and the second communicator, transmitting the on-information to the first communicator via the wireless communication network by the second communicator in a case where the second communicator detects the occurrence of the change of the electric power of the electrical apparatus from the off-state to the on-state, maintaining the electric power of the electrical apparatus in the on-state by the second communicator for a period in which the wireless communication between the second communicator and the first communicator continues, and changing the electric power of the electrical apparatus from the on-state to the off-state by the second communicator in a case where the second communicator detects the occurrence of an interruption of the wireless communication between the second communicator and the first communicator. These general and specific aspects may be implemented using a system and a method, and any combination of systems and methods.

The remote monitoring method disclosed herein allows it perform charging depending on use of the electrical apparatus of the user without using a prepaid card in the manner that suppresses a possibility that the electrical apparatus is used fraudulently without payment by interrupting wireless communication.

DETAILED DESCRIPTION

The present disclosure is described in further detail below with reference to embodiments in conjunction with drawings.

First Embodiment

A remote monitoring system according to a first embodiment is a charging system in which a server remotely monitors, via a wireless communication network, a state of a power supply of an air conditioner installed in a room of an apartment house, calculates an amount of charge for use of the depending on the state of the power supply of the air conditioner, and performs a charging process according to the calculated amount of charge for use. In the remote monitoring, the state of the power supply of the air conditioner is remotely monitored to detect whether it is in an on-state or an off-state.

The term "on-state" and "off-state" generally mean an on-state and an off-state of a main power supply in an electrical apparatus. However, when the main power supply is always in the on-state, an off-state of a main operation of the electrical apparatus, that is a standby-state, is defined as the "off-state" and an on-state of a main operation of the electrical apparatus is defined as the "on-state".

The charging process may be performed, for example, as follows: (1) the amount of charge for use of the air conditioner is calculated based on the operation time of the air conditioner, and the calculated amount is charged; (2) the amount of charge for use of the air conditioner is calculated based on the amount of electric power consumed by the air conditioner, and the calculated amount is charged; or in other manners. In the first embodiment, by way of example, it is assumed by way of example that the charging process is performed such that the amount of charge for use of the air conditioner is calculated based on the operation time of the air conditioner, and the calculated amount is charged. Note that in a case where the amount of charge for use is calculated based on the power consumed by the air conditioner, for example, the charge for use per unit power consumption may be predetermined, and the air conditioner may send information indicating consumed electric power to the server.

Figure 1:
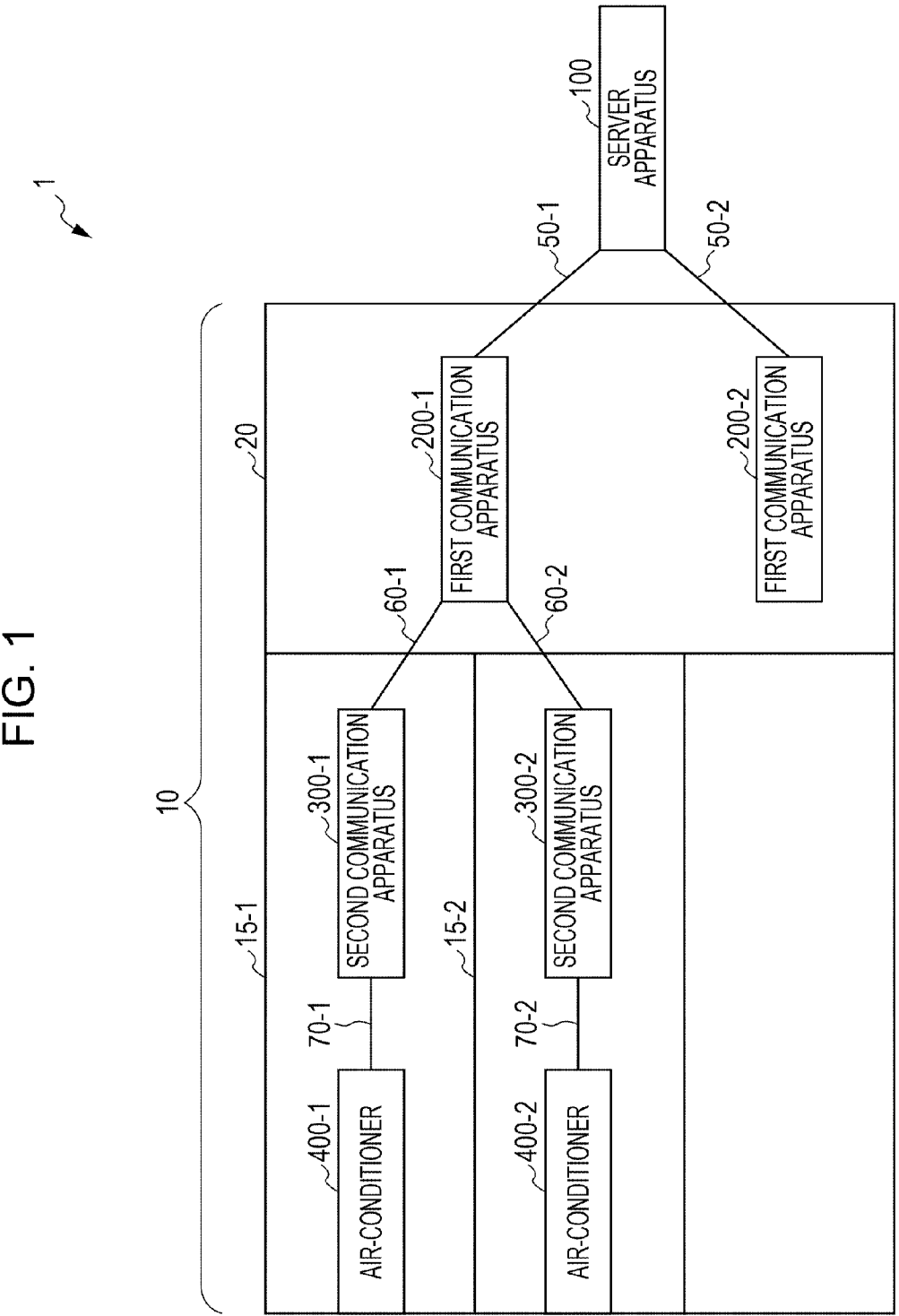
FIG. 1 is a block diagram illustrating an overview of a system configuration of a remote monitoring system according to first embodiment.

FIG. 1 is a block diagram illustrating an overview of a system configuration of the remote monitoring system according to the first embodiment. The remote monitoring system 1 illustrated in FIG. 1 includes a server 100, first communicators 200-1 and 200-2, second communicators 300-1 and 300-2, and air conditioners 400-1 and 400-2. Note that in FIG. 1, second communicators that wirelessly communicate with the first communicator 200-2 via a wireless communication path are not illustrated.

The server 100 is connected to the first communicators 200-1 and 200-2 via respective wired communication paths 50-1 and 50-2. Note that the server 100 may be connected to the respective first communicators 200-1 and 200-2 via communication paths including a wireless communication path. The first communicator 200-1 is capable of wirelessly communicating with the second communicator 300-1 via a wireless communication path 60-1, while the first communicator 200-1 is capable of wirelessly communicating with the second communicator 300-2 via a wireless communication path 60-2.

Furthermore, the second communicators 300-1 and 300-2 are respectively connected to the air conditioners 400-1 and 400-2 via respectively wired communication paths 70-1 and 70-2. The air conditioners 400-1 and 400-2 are respectively installed in rooms 15-1 and 15-2 of an apartment house 10. The second communicators 300-1 and 300-2 are respectively installed in the rooms 15-1 and 15-2 in which the respective air conditioners 400-1 and 400-2, and the second communicators 300-1 and 300-2 are respectively connected via wires to the air conditioners 400-1 and 400-2. The first communicators 200-1 and 200-2 are installed in a corridor 20 of the apartment house 10. Note that the installation places described above are merely examples.

Furthermore, the numbers of first communicators, second communicators, and air conditioners are merely examples. The server 100 communicates with the first communicators 200-1 and 200-2 via respective wired communication paths 50-1 and 50-2. The server 100 remotely monitors the air conditioners 400-1 and 400-2 via a wireless communication network, calculates amounts of charge for use of the air conditioners based on the operation times of the air conditioners 400-1 and 400-2, and charges the calculated amounts in real time. The operation time of each of the air conditioners 400-1 and 400-2 is defined by a period of time in which the state of the power supply of the air conditioner 400-1 or 400-2 is in the on-state. The server 100 is realized, for example, using a personal computer or a similar apparatus, or a dedicated apparatus. Details of the configuration and the operation of the server 100 will be described later.

The first communicator 200-1 communicates with the server 100 via the wired communication path 50-1, and wirelessly communicates with the second communicators 300-1 and 300-2 via the respective wireless communication paths 60-1 and 60-2. The first communicator 200-1 monitors wireless communication on the wireless communication paths 60-1 and 60-2 to detect a communication interruption. In a case where the first communicator 200-1 detects an occurrence of a continuous communication interruption for a period equal to or longer than a first threshold value T1, the first communicator 200-1 notifies the server 100 of the occurrence. The communication interruption in the wireless communication path 60-1 or 60-2 is defined by an interruption of wireless communication between the first communicator 200-1 and the second communicator 300-1 or 300-2.

In a case where the first communicator 200-1 detects a normal wireless communication via the wireless communication path 60-1 or 60-2 after the continuation of the communication interruption for a period equal to or longer than the first threshold value T1, the first communicator 200-1 notifies the server 100 of the detection of the normal wireless communication. The normal wireless communication via the wireless communication path 60-1 or 60-2 is defined, for example, by a normal wireless communication between the first communicator 200-1 and the second communicator 300-1 or 300-2. The first communicator 200-2 is substantially similar in function to the first communicator 200-1.

Each of the first communicators 200-1 and 200-2 may be realized, for example, by a wireless adaptor designed for use with an air conditioner. Details of the configuration and the operation of the first communicators 200-1 and 200-2 and details of the first threshold value T1 will be described later. The second communicators 300-1 and 300-2 wirelessly communicate with the first communicator 200-1 via the respective wireless communication paths 60-1 and 60-2, and respectively communicate with the air conditioners 400-1 and 400-2 via the respective wired communication paths

70-1 and 70-2. The second communicators 300-1 and 300-2 respectively monitor wireless communication in the wireless communication paths 60-1 and 60-2 to detect communication interruption. In a case where the second communicator 300-1 or 300-2 detects an occurrence of a communication interruption for a period equal to or longer than a second threshold value T2, the second communicator 300-1 or 300-2, which detected the occurrence of communication interruption, forcibly turns off the power supply of the corresponding one of the air conditioners 400-1 and 400-2. The communication interruption on the wireless communication path 60-1 or 60-2 is defined by an interruption of wireless communication between the first communicator 200-1 and the second communicator 300-1 or 300-2.

The second communicator 300-1 or 300-2, which detected the occurrence of communication interruption, performs a control operation such that the electric power of the corresponding one of the air conditioners 400-1 and 400-2 is forced to be turned off and maintained in the off-state until a normal wireless communication is detected in the corresponding one of the wireless communication paths 60-1 and 60-2 after the continuation of the communication interruption for the period equal to or longer than the second threshold value T2. An example of a normal wireless communication via the wireless communication path 60-1 or 60-2 is receiving of a signal transmitted from the first communicator 200-1. The second communicators 300-1 and 300-2 may each be realized using a controller such as a home energy management system (HEMS) controller or the like. Details of the configuration and the operation of the second communicators 300-1 and 300-2 and details of the second threshold value T2 will be described later.

The air conditioners 400-1 and 400-2 respectively communicate with the second communicators 300-1 and 300-2 via the respective wired communication paths 70-1 and 70-2. The air conditioners 400-1 and 400-2 respectively output power state information of the air conditioners 400-1 and 400-2 to the respective second communicators 300-1 and 300-2. The power state information of the air conditioner 400-1 and 400-2 each indicates whether the state of the power supply of the corresponding one of the air conditioner 400-1 and 400-2 is in the on-state or the off-state. Herein, information indicating that the state of the power supply of an air conditioner is in the on-state is referred to as on-information, while information indicating that the state of the power supply of an air conditioner is in the off-state is referred to as off-information. The second communicators 300-1 and 300-2 respectively transmit signals associated with the power state information of the air conditioners 400-1 and 400-2 to the server 100 via the first communicator 200-1 repeatedly at regular or irregular time intervals each equal to or shorter than, for example, a minimum charging time corresponding to a minimum unit in charging process. The power state information of each of the air conditioners 400-1 and 400-2 includes information indicating whether the state of the power supply of the air conditioner is in the on-state or the off-state (on-information or off-information), electric apparatus identification information identifying the air conditioner, and the like. The second communicators 300-1 and 300-2 may detect the state of the power supply of the respective air conditioners 400-1 and 400-2 and if a change in the state of the power supply occurs, a signal associated with the power state information of the air conditioner 400-1 or 400-2, whose state of the power supply has changed, may be transmitted to the server 100.

For example, in a case where there is no remaining usable amount in a user's account corresponding to the air conditioner 400-1 or 400-2, the corresponding air conditioner 400-1 or 400-2 forcibly turns off the electric power under the control of the server 100 and under the control of the second communicator 300-1 or 300-2. More detailed descriptions of the configuration and the operation of the server 100 will be given later. The remote monitoring system 1 described above is capable of remotely performing the charging process for each of one or more air conditioners depending on the operation time of each air conditioner in a centralized manner by using one server 100 without needing a prepaid card. Use of the wireless communication path as the communication path between the first communicator and the second communicator makes it unnecessary to perform a wiring work between the first communicator and the second communicators, which allows a great reduction in instruction/construction cost. Furthermore, in a case where a communication interruption in a wireless communication path between the first communicator and the second communicator occurs continuously for a period of time equal to or longer the second threshold value T2, the electric power of the corresponding air conditioner is forced to be turned off, and the electric power of the corresponding air conditioner is maintained in the off-state until a normal wireless communication is detected after the communication interruption, which makes it possible to prevent the air conditioner from being used fraudulently without payment by interrupting the wireless communication.

Figure 2:
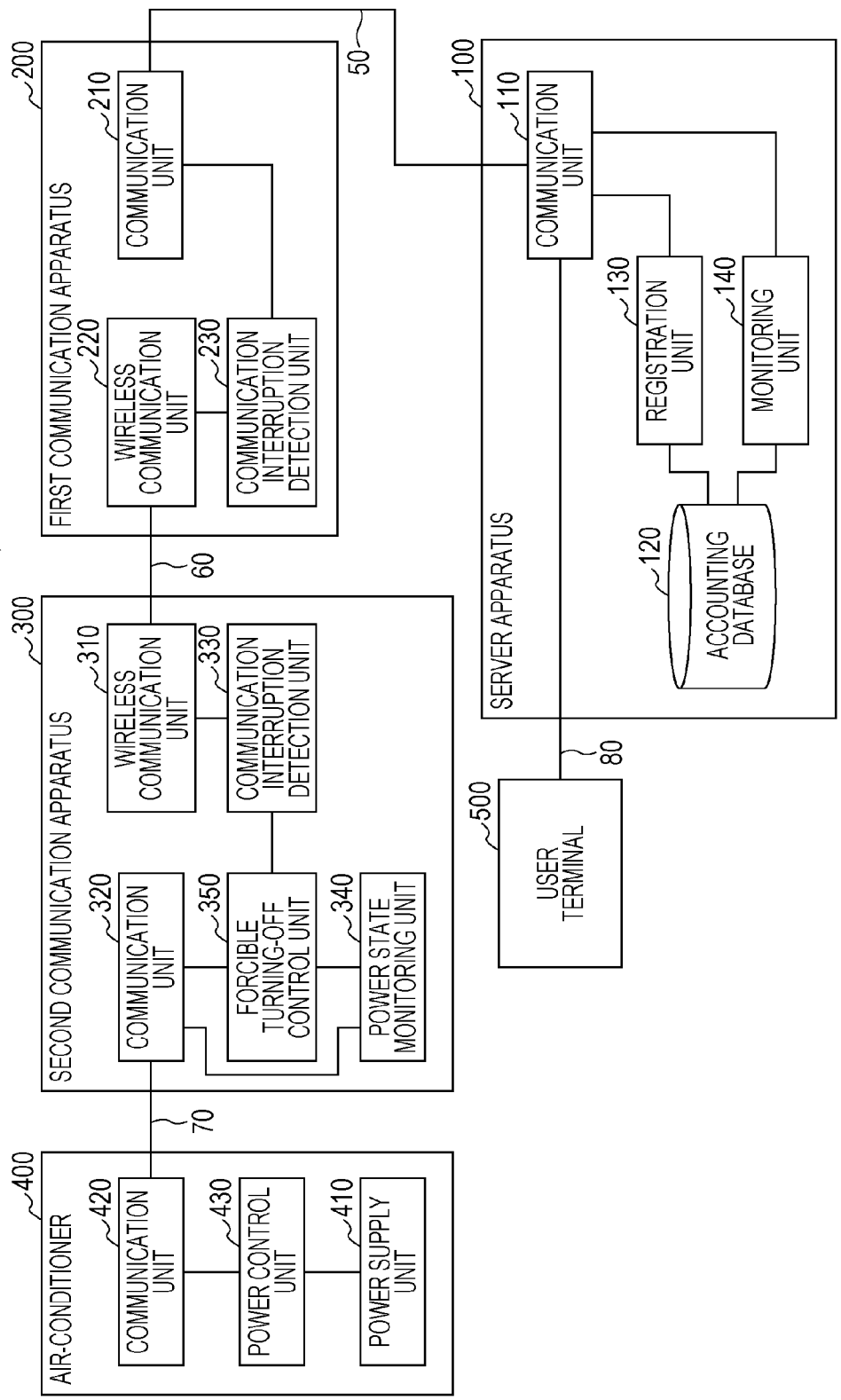
FIG. 2 is a block diagram illustrating details of the system configuration of the remote monitoring system illustrated in FIG. 1.

FIG. 2 is a block diagram illustrates a detailed system configuration of the remote monitoring system 1 illustrated in FIG. 1. Note that FIG. 2 also illustrate a user terminal 500 that may be connected to the server 100. In FIG. 2, a first communicator 200, a second communicator 300, and an air conditioner 400 respectively correspond to the first communicators 200-1 and 200-2, the second communicators 300-1 and 300-2, and the air conditioners 400-1 and 400-2 illustrated in FIG. 1. Furthermore, in FIG. 2, a wired communication path 50, a wireless communication path 60, and a wired communication path 70 respectively correspond to the wired communication paths 50-1 and 50-2, the wireless communication paths 60-1 and 60-2, and the wired communication paths 70-1 and 70-2.

First, a detailed configuration of the server 100 illustrated in FIG. 2 is described below. The server 100 includes a communicator 110, an accounting database 120, a register 130, and a monitor 140. The communicator 110 is connected to the wired communication path 50 such that the communicator 110 is allowed to transmit/receive data to/from a communicator 210 of the first communicator 200 connected to the wired communication path 50. The communicator 110 is also connected to a communication network (a communication network including one or both of a wired communication path and a wireless communication path) 80 such that the communicator 110 is allowed to transmit/receive data to/from the user terminal 500 connected to the communication network 80.

Figures 3, 4:
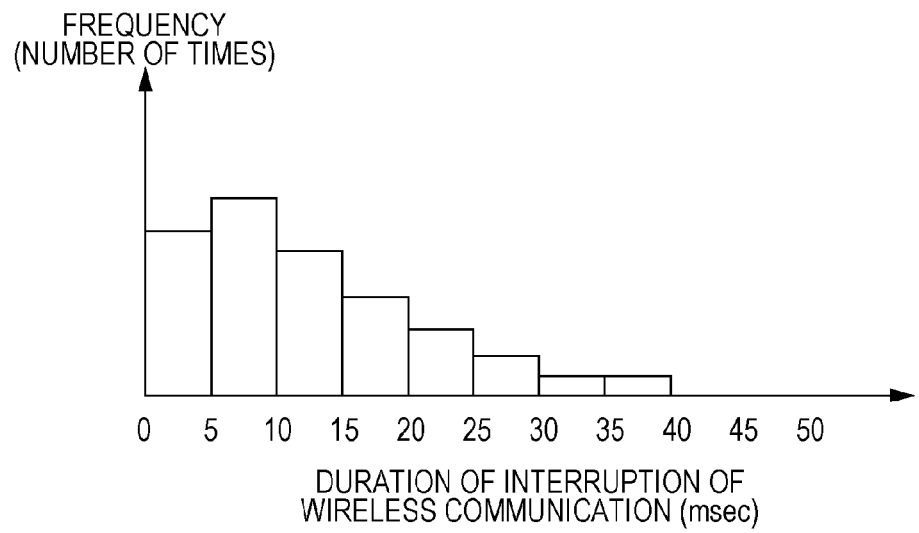
FIG. 3 is a diagram illustrating an example of a content of an accounting database in a server illustrated in FIG. 2.
FIG. 4 is a graph illustrating a frequency distribution of a duration time of wireless communication interruption.

The accounting database 120 a database for storing accounting data associated with each user. FIG. 3 illustrates an example of an accounting database. In the accounting database 120, a user ID, a password, identification information identifying an air conditioner, an amount of charge for use of electricity, an operation time, and a remaining usable amount are stored for each user. Alternatively, for example, instead of the remaining usable amount, a remaining amount of time for which use is allowed may be stored in the accounting database 120, and the remaining amount of time may be reduced according to the operation time. Note that the accounting database 120 may be provided outside the server 100.

When the register 130 receives user information that is input by a user using the user terminal 500 when an initial registration is performed, the register 130 registers the received user information in the accounting database 120. The user information may include, for example, a user ID, a password, identification information identifying an air conditioner used by the user, and/or the like. The register 130 receives advanced payment information that is input by a user using the user terminal 500 when the user performs advanced payment, and the register 130 updates the content stored in the accounting database 120 based on the received advanced payment information. The advanced payment information includes a user ID, a password, and an amount of advanced payment.

The monitor 140 performs a charging process according to use of the air conditioner 400. In a case where the monitor 140 determines, based on the power state information of the air conditioner 400 transmitted from the air conditioner 400, that the state of the power supply of the air conditioner 400 changes from the off-state to the on-state, the monitor 140 starts the charging process. In the charging process, the monitor 140 calculates the operation time of the air conditioner 400, the amount of charge for use of electricity, and the remaining usable amount, and updates the content of the accounting database 120. The operation time of the air conditioner 400 is defined as a time in which the state of the power supply of the air conditioner is in the on-state.

In this charging process, for example, a charge for use per minimum charging time corresponding to a minimum unit in charging process is predetermined, and the monitor 140 adds an amount of charge for use of the air conditioner per minimum charging time each time the air conditioner 400 is used for the minimum charging time, and the monitor 140 subtracts the amount of charge for use of the air conditioner per minimum charging time from the remaining usable amount. The monitor 140 ends the charging process when one of the following conditions is satisfied: (1) it is determined that the remaining usable amount has reached zero; (2) it is determined based on the power state information of the air conditioner 400 transmitted from the air conditioner 400 that the state of the power supply of the air conditioner 400 is changed from the on-state to the off-state; or (3) a communication interruption notification signal is received from the first communicator 200 and is notified thereby of an occurrence of an interruption of communication via the wireless communication path 60 for a continuous period of time equal to or longer than a first threshold value T1.

In the case where the monitor 140 determines that the remaining usable amount has reached zero, the monitor 140 outputs a forcibly turn-off command signal to the communicator 110 to command the air conditioner 400 to forcibly turn off the electric power of the air conditioner 400. Note that there is a possibility that a plurality of second communicators 300 are wirelessly connected to the first communicator 200. In this case, the monitor 140 identifies a second communicator 300 giving rise to the communication interruption over a continuous period of time equal to or longer than the first threshold value T1, and the monitor 140 ends the charging process on the air conditioner 400 connected to the identified second communicator 300.

This can be achieved, for example, as follows. When the first communicator 200 transmits a communication interruption notification signal, the first communicator 200 generates the communication interruption notification signal so as to include information identifying a second communicator 300 that has given rise to a communication interruption for a continuous period of time equal to or longer than the first threshold value T1. The monitor 140 acquires, in advance, route information including information identifying the first communicator 200 and the second communicator 300 located between the server 100 and the air conditioner 400. For example, a traceroute command may be used to acquire the route information. Using the route information acquired in advance, the monitor 140 identifies the air conditioner 400 connected to the second communicator 300 indicated by the identification information included in the communication interruption notification signal, and the monitor 140 stops the charging process associated with use of the identified air conditioner.

The method described above is merely an example, and any other methods may be employed as long as it is possible for the monitor 140 to identify the second communicator 300 giving rise to a continuous communication interruption between the first communicator 200 and the second communicator 300 over a period of time equal to or longer than the first threshold value T1, to stop the charging process on the air conditioner 400 connected to the identified second communicator 300. Next, the configuration of the first communicator 200 illustrated in FIG. 2 is described below. The first communicator 200 includes, as illustrated in FIG. 2, a communicator 210, a wireless communicator 220, and a communication interruption detector 230.

The communicator 210 is connected to the wired communication path 50 such that the communicator 210 is allowed to transmit/receive data to/from a communicator 110 of the server 100 connected to the wired communication path 50. The wireless communicator 220 performs wireless communication to transmit/receive data to/from a wireless communicator 310 of the second communicator 300 via the wireless communication path 60. The communication interruption detector 230 monitors the wireless communication performed by the wireless communicator 220 to detect communication interruption on the wireless communication path 60 between the first communicator 200 and the second communicator 300. In a case where the communication interruption detector 230 detects an occurrence of continuous communication interruption for a period equal to or longer than a first threshold value T1, the communication interruption detector 230 outputs a communication interruption notification signal to the communicator 210 to notify the server 100 of the occurrence of the communication interruption. In a case where communication interruption detector 230 detects an occurrence of a normal wireless communication in the wireless communication path 60 after the continuation of the communication interruption for the period equal to or longer than the first threshold value T1, the communication interruption detector 230 outputs a communication recovery notification signal to the communicator 210 to notify the server 100 of the occurrence of the normal wireless communication.

Next, the configuration of the second communicator 300 illustrated in FIG. 2 is described below. The second communicator 300 includes, as illustrated in FIG. 2, a wireless communicator 310, a communicator 320, a communication interruption detector 330, a power state monitor 340, and forcible turning-off control circuitry 350. The wireless communicator 310 performs wireless communication to transmit/receive data to/from a wireless communicator 220 of the first communicator 200 via the wireless communication path 60.

The communicator 320 is connected to the wired communication path 70 such that the communicator 320 is allowed to transmit/receive data to/from a communicator 420 of the air conditioner 400 connected to the wired communication path 70. The communication interruption detector 330 monitors the wireless communication performed by the wireless communicator 310 to detect communication interruption on the wireless communication path 60 between the first communicator 200 and the second communicator 300. In a case where the communication interruption detector 330 detects an occurrence of continuous communication interruption for a period equal to or longer than a second threshold value T2, the communication interruption detector 330 notifies the forcible turning-off control circuitry 350 of the occurrence of continuous communication interruption. In a case where the communication interruption detector 330 detects an occurrence of a normal wireless communication in the wireless communication path 60 after the continuation of the communication interruption for the period equal to or longer than the second threshold value T2, the communication interruption detector 330 notifies the forcible turning-off control circuitry 350 of the occurrence of the normal wireless communication.

The power state monitor 340 monitors the state of the power supply of the air conditioner 400 and notifies the forcible turning-off control circuitry 350 of the state of the power supply of the air conditioner 400. For example, the power state monitor 340 may detect the state of the power supply of the air conditioner 400 based on power state information transmitted from the air conditioner 400 to the server 100. Alternatively, the power state monitor 340 may inquire of the air conditioner 400 as to the state of the power supply and, based on a response to the inquiry, the power state monitor 340 may detect the state of the power supply of the air conditioner 400. The detection process described above is performed repeatedly at regular or irregular time intervals each equal to or shorter than, for example, the minimum charging time corresponding to the minimum unit in charging process.

In a case where the forcible turning-off control circuitry 350 determines, based on the notification from the power state monitor 340, that the state of the power supply of the air conditioner 400 is the on-state and furthermore the forcible turning-off control circuitry 350 receives, from the communication interruption detector 330, the notification of the occurrence of the continuous communication interruption for the period equal to or longer than the second threshold value T2, the forcible turning-off control circuitry 350 outputs a forcibly turn-off command signal to the communicator 320 to command the air conditioner 400 to forcibly turn off the electric power of the air conditioner 400.

In a case where the forcible turning-off control circuitry 350 determines, based on the notification from the power state monitor 340, that the state of the power supply of the air conditioner 400 is turned from the off-state to the on-state in a period before the notification of the detection of the normal wireless communication is received after the notification of the occurrence of continuous communication interruption for the period equal to or longer than the second threshold value T2, the forcible turning-off control circuitry 350 outputs a forcibly turn-off command signal to the communicator 320 to command the air conditioner 400 to forcibly turn off the electric power of the air conditioner 400. Alternatively, when the forcible turning-off control circuitry 350 receives the notification of the occurrence of continuous communication interruption for the period equal to or longer than the second threshold value T2, the forcible turning-off control circuitry 350 may output a signal to communicator 320 to disable the operation of a user setter such as remote control circuitry or the like of the air conditioner 400 instead of outputting the forcibly turn-off command signal described above. In this case, thereafter when the forcible turning-off control circuitry 350 receives the notification of the detection of the normal wireless communication, the forcible turning-off control circuitry 350 outputs a signal to the communicator 320 to enable the operation of the user setter of the air conditioner 400. The signal to disable the operation of the user setter is transmitted to the air conditioner 400 via the communicator 320. In response, the air conditioner 400 disables the operation of the user setter. Thus, the signal to disable the operation of the user setter provides a function similar to the function of the forcibly turning-off command. On the other hand, when the signal to enable the operation of the user setter is transmitted to the air conditioner 400 via the communicator 320, the air conditioner 400 enables the operation of the user setter.

A combination of functions of the communication interruption detector 330, the power state monitor 340, and the forcible turning-off control circuitry 350 allows it to prevent a user from fraudulently using the air conditioner 400 by interrupting the wireless communication between the second communicator 300 and the first communicator 200. Next, the configuration of the air conditioner 400 illustrated in FIG. 2 is described below. The air conditioner 400 includes, as illustrated in FIG. 2, a power supplier 410, a communicator 420, and power supply control circuitry 430.

The power supplier 410 is an electric power of the air conditioner. The communicator 420 is connected to the wired communication path 70 such that the communicator 420 is allowed to transmit/receive data to/from the communicator 320 of the second communicator 300 connected to the wired communication path 70. The power supply control circuitry 430 outputs, to the communicator 420, a signal associated with the power state information for notifying the server 100 of the state of the power supply of the power supplier 410 of the air conditioner 400.

In a case where the power supply control circuitry 430 receives, from the server 100, the forcibly turn-off command signal for forcibly turning off the power supply of the air conditioner 400, the power supply control circuitry 430 forcibly turns off the power supply of the power supplier 410. In a case where the power supply control circuitry 430 receives, from the second communicator 300, the forcibly turn-off command signal for forcibly turning off the power supply of the air conditioner 400, the power supply control circuitry 430 forcibly turns off the power supply of the power supplier 410. This forcibly turn-off command signal is transmitted from the second communicator 300, for example, in a case where when the state of the power supply of the air conditioner 400 is in the on-state, a communication interruption occurs over a continuous time period equal to or longer than the second threshold value T2, or in a case where the electric power of the air conditioner 400 is turned on using remote control circuitry or the like during a period before a normal wireless communication is detected after the communication interruption for the continuous time period equal to or longer than the second threshold value T2.

In a case where a user performs an operation using a user setter to turn on the electric power, the power supply control circuitry 430 turns on the electric power of the power supplier 410. In a case where a user performs an operation to turn off the electric power, the power supply control circuitry 430 turns off the electric power of the power supplier 410. Note that the user setter is an apparatus that allows a user to directly set the operation state (by turning on/off the electric power) of the air conditioner using remote control circuitry such as infrared remote control circuitry or using a switch. The user setter may have a function of setting temperature. A user may set the operation state of the air conditioner via the server 100 by using the user terminal 500. However, in the case where the operation state is set via the server 100, the setting of the air conditioner takes a certain time, and thus it is more convenient to provide the user setter such as remote control circuitry or a switch that allows a user to perform the direct setting.

Next, the user terminal 500 illustrated in FIG. 2 is described below. The user terminal 500 is a terminal used by a user to perform a user registration in the accounting database 120 or to perform advance payment. The user terminal 500 is connected to the communicator 110 of the server 100 via the communication network 80. Specific examples of the user terminal 500 include a personal computer, a portable terminal, and the like.

Setting of the first threshold value T1 and the second threshold value T2 is described below. In the wireless communication, unlike the wired communication, communication interruption can occur frequently even in a normal operation state. The normal operation state is an operation state in which there is no abnormality in devices associated with wireless communication. Specific examples of devices associated with the wireless communication include the first communicator 200, the second communicator 300, and the like. Examples of causes of interruption of wireless communication include interference of a radio signal between another wireless communication system using the same radio frequency band, a fluctuation in a wireless communication environment such as fading, and the like. In a case where every time an interruption of wireless communication occurs, it is regarded that an interruption of communication interruption occurs, and the electric power of the air conditioner is forcibly turned off, then the frequency of forcibly turning off the electric power of the air conditioner increases, which makes it difficult for the air conditioner to operate stably for a long period.

What is needed to be detected in the charging process is not a communication interruption that occurred frequently in the normal operation state but a communication interruption caused by the intentional interruption for the purpose of fraud or caused by a failure of a device, in response to which the electric power of the air conditioner is to be forcibly turned off. In wireless communication systems using the same radio frequency band, a wireless communication technique such as a packet transmission method used in a wireless local area network (LAN) or a carrier sense method is used, and such a wireless communication technique has functions of preventing a collide between packet signals, preventing interference in wireless communication by changing wireless channels, and the like. Therefore, a wireless communication interruption over a long period hardly occurs.

Fluctuations in a wireless communication environment such as fading do not frequently result in an interruption of a wireless communication over a long period. Therefore, by slightly increasing the first threshold value T1 and the second threshold value T2, it becomes possible to detect a communication interruption over a period of time that cannot occur in a normal operation state while preventing the electric power of the air conditioner from being forcibly turned off frequently due to a communication interruption that occurs frequently in the normal operation state. Next, a definition and a measurement of a typical value of a duration of a continuous wireless communication interruption in the normal operation state are described below. Herein let Ns denote the number of packets transmitted in wireless communication in the normal operation state, Ts denote a time in which all packets are transmitted, Ps denote a packet error rate, and Tl denote a packet length. In the normal operation state, the packet error rate is, for example, in a range from 0.1% to 1%, at most. In this case, the number of error packets (Ne) is given by Ne=Ns×Ps. In a case where occurrences of error packets are not continuous, the error duration time (Tx) is given by Tx=Ts/Ns. On the other hand, in a case where all error packets occur continuously, the error duration time is given by Tx=Ne×Tl=Ns·Ps·Tl. Therefore, the typical value of the duration time of the wireless communication interruption in the normal operation state may be estimated to be in a range from about Ts/Ns seconds to Ns·Ps·Tl seconds. The typical value may vary depending on the communication environment. In a case where the wireless communication is performed according to a standard such as W-LAN (IEEE802.11), ZigBee (IEEE802.15.4), or the like in a common wireless environment, the typical value of the duration time of the wireless communication interruption is in a range from about 1 millisecond to 100 milliseconds. By setting the first threshold value T1 and the second threshold value T2 to be sufficiently longer than the above-described typical value, it becomes possible to prevent the electric power of the air conditioner from being forcibly turned off frequently due to a communication interruption that occurs frequently in the normal operation state. Note that the above-described typical value of the duration time of the wireless communication interruption in the normal operation state is merely an example, and the typical value or a value identical thereto may be defined and measured differently. Note that the typical value of the duration time of continuous interruption is not dependent on a specific remote monitoring system, and thus when a wireless communication standard to be used is given, the typical value of the duration time of continuous interruption can be estimated. For example, the typical value of the duration time of the wireless communication interruption in the normal operation state may be given by the average value of duration time of the communication interruption.

FIG. 4 illustrates an example of a measured frequency distribution of the duration time of wireless communication interruption. It is determined from this graph that the average value of duration time of the wireless communication interruption is 10 milliseconds. The frequency distribution of the duration time of the wireless communication interruption varies depending on the place where the communication apparatus for wireless communication is installed, and thus the measurement of the frequency distribution of the duration time may be performed at the specific place where the communication apparatus for wireless communication is installed.

By setting the first threshold value T1 and the second threshold value T2 to be sufficiently longer than the average value, that is, 10 milliseconds, it becomes possible to prevent a communication interruption that occurs frequently in the normal operation state from being incorrectly determined as a communication interruption that should be handled such that the electric power of the air conditioner is forcibly turned off in response to the communication interruption, which makes it possible to prevent the electric power of the air conditioner from being forcibly turned off frequently. Note that the first threshold value T1 and the second threshold value T2 may be equal to each other or may be different from each other. The second threshold value T2 may be equal to or smaller than the first threshold value T1. In this case, when a communication interruption occurs, the electric power of the air conditioner is turned off before the charging process is stopped, which prevents the air conditioner from being used without payment.

However, if the first threshold value T1 and the second threshold value T2 are set to be too large, the following problem may occur. For any communication interruption that occurs in a period before the elapsed time reaches the second threshold value T2 after the first communication interruption is detected, it is impossible to determine whether the communication interruption is a communication interruption that may occur in the normal operation state or a communication interruption caused by some error such as a fraud operation. Therefore, in the charging process, it is not allowed to set the minimum unit of charging time equal to or smaller than the first threshold value T1 or the second threshold value T2.

For example, when the minimum charging time corresponding to the minimum unit in charging process is 1 minute, to perform the charging in real time in the charging process with accuracy of 1 minute or better, the processing time of each process in the system is needed to be less than 1 minute. The shorter the processing time that determines the real-time performance of the system, the better result is achieved. It is desirable that the processing time is at least less than an allowable delay time allowed in the system.

Thus, by setting the first threshold value T1 and the second threshold value T2 so as to be equal to or less than an allowable delay time, it is possible to satisfy the requirement of performance of the system in terms of the delay. A delay in process may be allowed to a certain degree as long as the delay is shorter than the minimum charging time in the charging process. That is, when the first threshold value T1 and the second threshold value T2 are set to be equal to or less than the minimum charging time, the above described requirement is satisfied.

Figure 5:
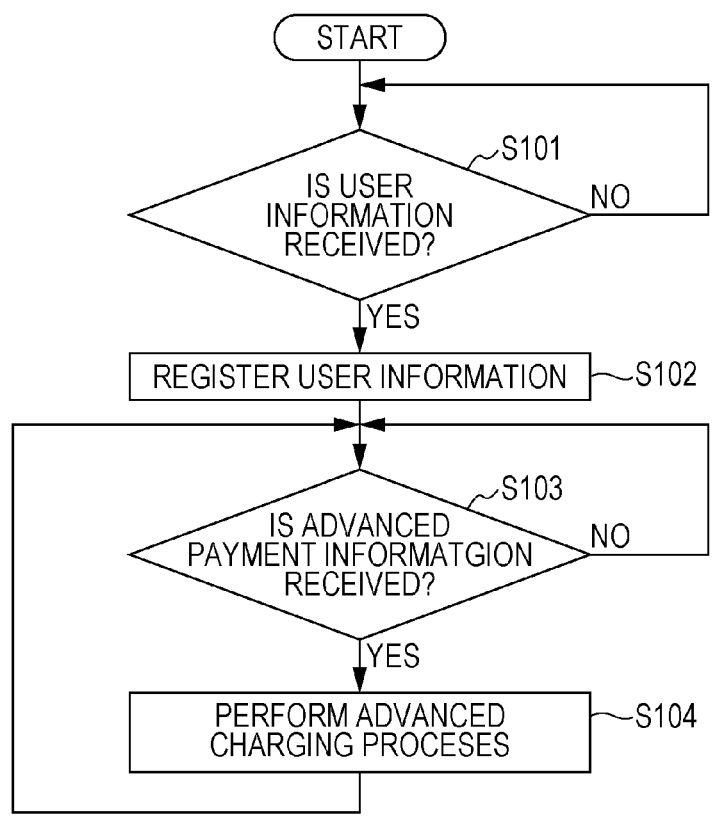
FIG. 5 is a flow chart of a process of user registration and advanced charging performed by the server illustrated in FIG. 2.

Next, the operation of each apparatus (the server 100, the first communicator 200, the second communicator 300, and the air conditioner 400) in the remote monitoring system 1 illustrated in FIG. 2 is described below with reference to figures. First, the user registration and the advanced charging process performed by the server 100 illustrated in FIG. 2 are described with reference to FIG. 5. Note that in FIG. 5, it is assumed, for simplicity of illustration, that the user registration and the advanced charging process are performed for one user.

In the server 100, the register 130 determines whether user information (a user ID, a password, electric apparatus identification information of an air conditioner to be used) is received (step S101). If the answer to step S101 is NO, the register 130 repeatedly performs step S101 until user information is received. In a case where it is determined that user information is received (YES in S101), the register 130 registers the received user information in the accounting database 120 (step S102). Note that a user is allowed to describe amount of advanced payment in the user information thereby allowing it to perform advanced payment when the user registration is performed.

The register 130 determines whether advanced payment information (a user ID, a password, an amount of advanced payment) is received (step S103). If the answer to step S103 is NO, the register 130 repeatedly performs step S103 until advanced payment information is received (that is, until the answer to step S103 is YES). In a case where the register 130 receives advanced payment information (YES in S103), the register 130 performs authentication on the password and the like, and then the register 130 adds the newly input amount of advanced payment to a current value in the accounting database 120 based on the advanced payment information (step S104).

Figure 6:
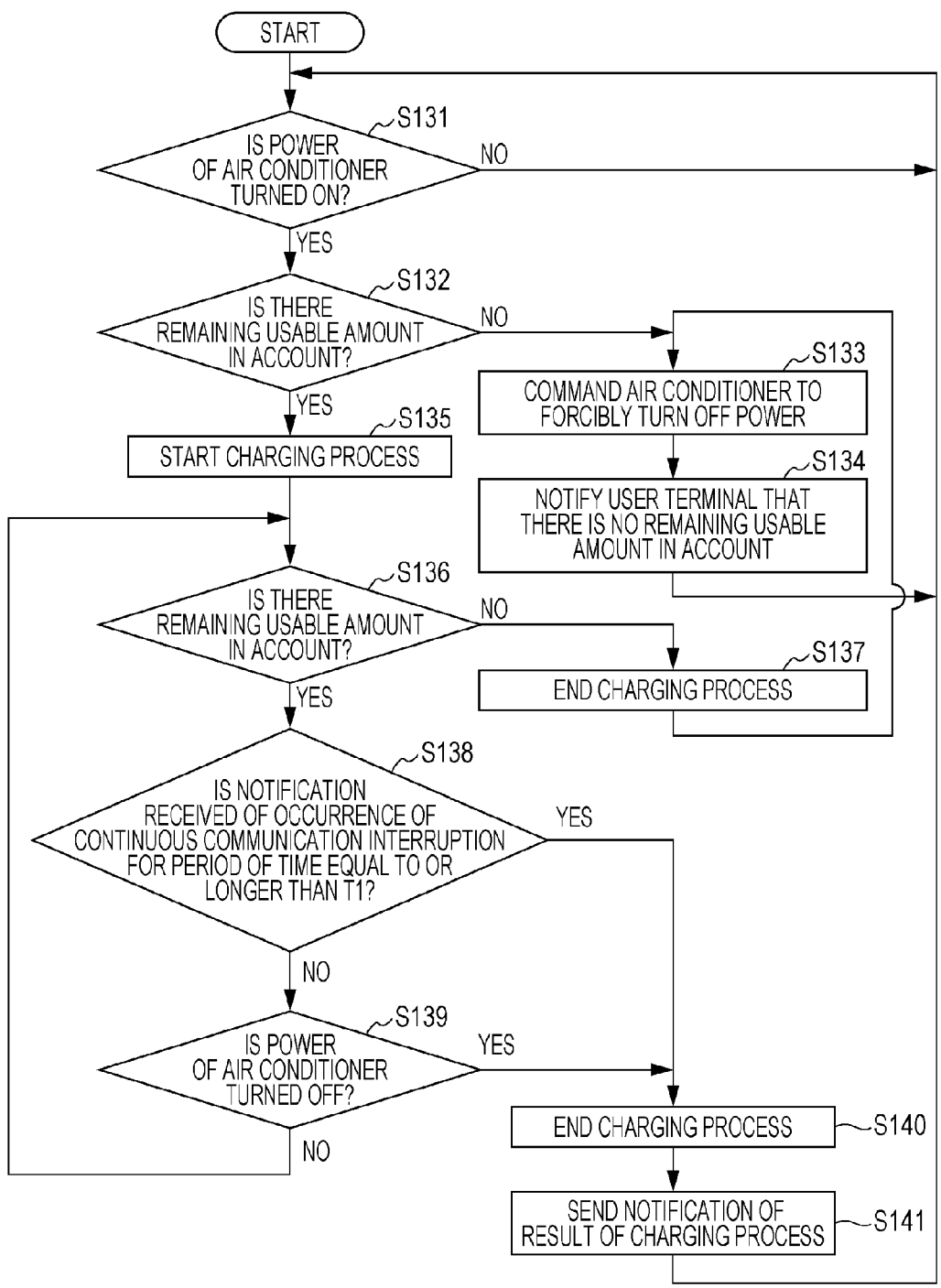
FIG. 6 is a flow chart of a charging process performed by the server illustrated in FIG. 2.

Next, the charging process performed by the server 100 illustrated in FIG. 2 is described below with reference to FIG. 6. FIG. 6 is a flow chart of the charging process performed by the server 100 illustrated in FIG. 2. Note that in FIG. 6, for simplicity of illustration, it is assumed that the charging process is performed for one user. In the server 100, the monitor 140 determines, based on power state information transmitted from the air conditioner 400, whether the state of the power supply of the air conditioner 400 changes from the off-state to the on-state (step S131). If the answer to step S131 is NO, the monitor 140 repeats the process in step S131 until the monitor 140 determines that the state of the power supply of the air conditioner 400 has changed from the off-state to the on-state (that is, until the answer to step S131 is YES).

In a case where the monitor 140 determines that the state of the power supply of the air conditioner 400 has changed from the off-state to the on-state (YES in S131), the monitor 140 refers to the accounting database 120 to determine whether there is a remaining usable amount in the account of the user of the air conditioner 400 (step S132). Herein the expression "there is a remaining usable amount" means that the remaining usable amount in the account is equal to or greater than the amount of charge for use of the air conditioner per minimum charging time corresponding to the minimum unit in charging process. In a case where it is determined that there is no remaining usable amount in the account (NO in S132), the monitor 140 transmits a forcibly turn-off command signal for forcibly turning off the electric power of the air conditioner 400 (step S133). This forcibly turn-off command signal is received by the air conditioner 400 via the wired communication path 50, the first communicator 200, the wireless communication path 60, the second communicator 300, and the wired communication path 70. In response to receiving the forcibly turn-off command signal, the power supply control circuitry 430 of the air conditioner 400 forcibly turns off the electric power of the power supplier 410. Furthermore, the monitor 140 transmits a notification signal to the user terminal 500 to notify that there is no remaining usable amount in the account of the user (step S134). In response to receiving this notification signal, for example, the user terminal 500 displays information indicating that there is no reaming usable amount in the account.

In a case where it is determined that there is a remaining usable amount in the account (YES in S132), the monitor 140 starts the charging process (step S135). The charging process includes, for example, measuring the operation time, calculating the amount of charge for use of electricity based on the measured operation time, reducing the remaining usable amount, and the like. More specifically, in the charging process, the amount of charge for use of the air conditioner per minimum charging time is subtracted from the remaining usable amount every time the air conditioner is used for the minimum charging time corresponding to the minimum unit in charging process. In the charging process, the monitor 140 refers to the accounting database 120 to determine whether there is a remaining usable amount in the account of the user of the air conditioner 400 (step S136). In a case where there is no remaining usable amount in the account (NO in S136), the monitor 140 ends the charging process (step S137), and the processing flow proceeds to step S133. On the other hand, in a case where it is determined that there is a remaining usable amount in the account (YES in S136), the processing flow proceeds to step S138.

In step S138, the monitor 140 determines whether a communication interruption notification signal is received that is transmitted from the first communicator 200 to notify of an occurrence of an interruption of communication between the first communicator 200 and the second communicator 300 for a continuous period of time equal to or longer than the first threshold value T1 (step S138). In a case where it is determined that the communication interruption notification signal is received (YES in S138), the monitor 140 ends the charging process (step S140), and the monitor 140 notifies the user terminal 500 of a result of the charging process including the remaining usable amount and the like (step S141). In response to receiving this notification, the user terminal 500 displays the result of the charging process including the remaining usable amount and the like.

In a case where it is determined that the communication interruption notification signal is not received (NO in S138), it is determined based on the power state information transmitted from the air conditioner 400 whether the state of the power supply of the air conditioner 400 has changed from the on-state to the off-state (step S139). In a case where it is determined that the state of the power supply of the air conditioner 400 has not changed from the on-state to the off-information (NO in S139), the process flow returns to step S136. On the other hand, in a case where the state of the power supply of the air conditioner 400 has occurred from the on-state to the off-information (YES in S139), the process in step S140 is performed.

Figure 7:
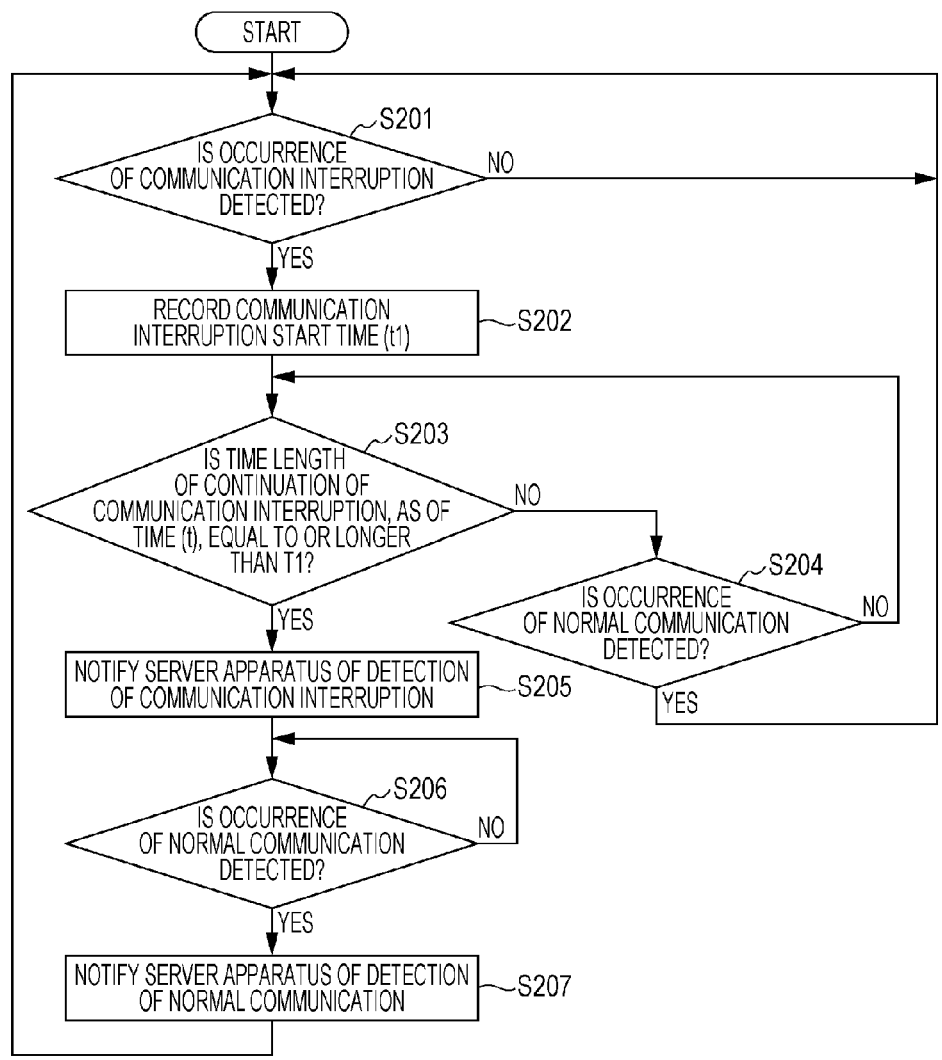
FIG. 7 is a flow chart of a process of communication interruption detection performed by a first communicator illustrated in FIG. 2.

Next, a process associated with the communication interruption detection performed by the first communicator 200 illustrated in FIG. 2 is described below with reference to FIG. 7. FIG. 7 is a flow chart of the process of the communication interruption detection performed by the first communicator 200 illustrated in FIG. 2. In the first communicator 200, the communication interruption detector 230 monitors a wireless communication via the wireless communication path 60 to detect a communication interruption (step S201). Note that the process of detecting whether there is a communication interruption or not is performed repeatedly at regular or irregular time intervals each shorter than the first threshold value T1. In a case where no communication interruption is detected (that is, when the answer to S201 is NO), the communication interruption detector 230 performs the process in step S201 repeatedly until a communication interruption is detected (that is, until the answer to S201 is YES). On the other hand, in a case where the communication interruption detector 230 detects a communication interruption (YES in S201), the communication interruption detector 230 records a detection time (t1) of the communication interruption as an interruption start time (step S202).

The communication interruption detector 230 determines whether the communication interruption duration time as of time t1 has reached a value equal to or greater than the first threshold value T1 (t−t1≥T1?) (step S203). In a case where it is not determined that the communication interruption duration time as of time t has reached the value equal to or greater than the first threshold value T1 (NO in S203), the communication interruption detector 230 detects an occurrence of a normal wireless communication performed after the interruption start time (t1) via the wireless communication path 60 (step S204). Note that the process of detecting whether a normal wireless communication has occurred or not is performed repeatedly at regular or irregular time intervals each shorter than the first threshold value T1. In a case where no normal wireless communication is detected (NO in S204), the processing flow returns to step S203. On the other hand, in a case where a normal wireless communication is detected (YES in S204), the processing flow returns to step S201.

In a case where it is determined that at time t the communication interruption duration time has reached the first threshold value T1 (YES in S203), the communication interruption detector 230 transmits a communication interruption notification signal to the server 100 to notify that the communication interruption has occurred over a continuous period of time equal to longer than the first threshold value T1 (step S205). When the server 100 receives this communication interruption notification signal (the answer to step S138 in FIG. 6 is YES), the server 100 regards that the state of the power supply of the air conditioner 400 has changed from the on-state to the off-state and the server 100 ends the charging process (step S140 in FIG. 6).

Thereafter, the communication interruption detector 230 detects a normal wireless communication performed via the wireless communication path 60 (step S206). In a case where no normal wireless communication is detected (that is when the answer to step S206 is NO), the communication interruption detector 230 performs the process in step S206 repeatedly until a normal wireless communication is detected. On the other hand, in a case where a normal wireless communication is detected (that is, when the answer to step S206 is YES), the communication interruption detector 230 transmits an end-of-communication-interruption notification signal to the server 100 to notify that the normal wireless communication has been detected after the continuous communication interruption for the period of time equal to or longer than the first threshold value (step S207).

Figure 8:
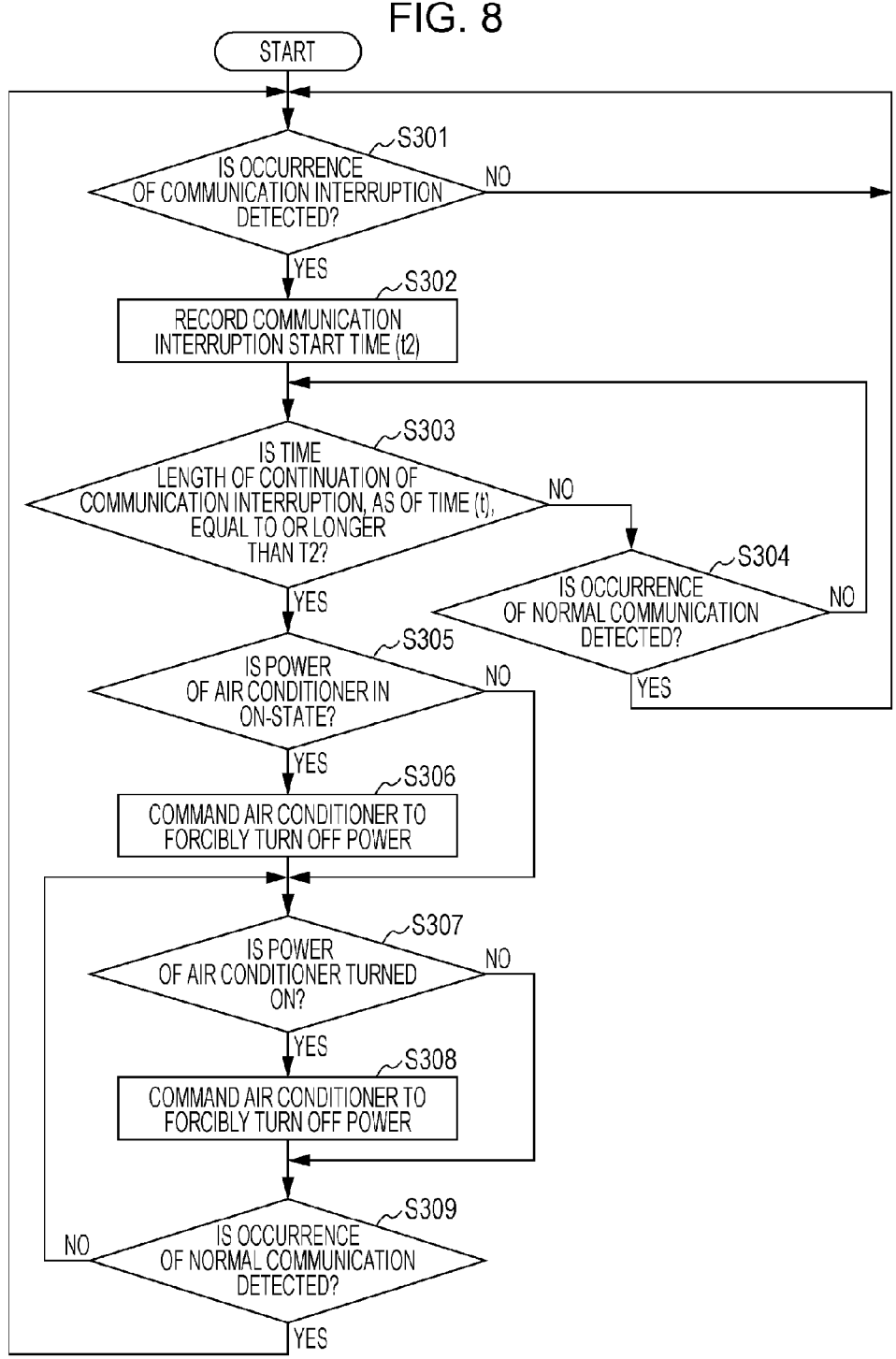
FIG. 8 is a flow chart of a process of detecting a communication interruption performed by a second communicator illustrated in FIG. 2.

Next, a process associated with the communication interruption detection performed by the second communicator 300 illustrated in FIG. 2 is described below with reference to FIG. 8. FIG. 8 is a flow chart of the process of the communication interruption detection performed by the second communicator 300 illustrated in FIG. 2. In the second communicator 300, the communication interruption detector 330 monitors a wireless communication via the wireless communication path 60 to detect a communication interruption (step S301). Note that the process of detecting whether there is a communication interruption is performed repeatedly, for example, at regular or irregular time intervals each shorter than the second threshold value T2. In a case where no communication interruption is detected (that is, when the answer to step S301 is NO), the communication interruption detector 330 performs the process in step S301 repeatedly until a communication interruption is detected (that is, until the answer to S301 is YES). On the other hand, in a case where the communication interruption detector 330 detects a communication interruption (YES in S301), the communication interruption detector 330 records a detection time (t2) of the communication interruption as an interruption start time (step S302).

The communication interruption detector 330 determines whether the communication interruption duration time as of time 1 has reached to a value equal to or greater than the second threshold value T2 (t−t2≥T2?) (step S303). In a case where it is not determined that the communication interruption duration time as of time t has reached a value equal to or greater than the second threshold value T2 (that is, when the answer to step S303 is NO), the communication interruption detector 330 detects an occurrence of a normal wireless communication performed after the interruption start time (t2) via the wireless communication path 60 (step S304). Note that the process of detecting whether there is a normal wireless communication is performed repeatedly, for example, at regular or irregular time intervals each shorter than the second threshold value T2. In a case where no normal wireless communication is detected (that is, when the answer to step S304 is NO), the processing flow returns to step S303. On the other hand, in a case where a normal wireless communication is detected (YES in S304), the processing flow returns to step S301.

In a case where it is determined that the communication interruption duration time as of time t has reached the value equal to or greater than the second threshold value T2 (YES in S303), the forcible turning-off control circuitry 350 determines whether the state of the power supply of the air conditioner 400 is in the on-state, based on the result of monitoring the state of the power supply of the air conditioner 400 performed by the power state monitor 340 (step S305). In a case where it is determined that the state of the power supply of the air conditioner 400 is not in the on-state (NO in S305), the processing flow proceeds to step S307. On the other hand, in a case where it is determined that the state of the power supply of the air conditioner 400 is in the on-state (YES in S305), the forcible turning-off control circuitry 350 transmits a forcibly turn-off command signal to the air conditioner 400 to forcibly turn off the electric power of the air conditioner 400 (step S306). When the air conditioner 400 receives this forcibly turn-off command signal via the wired communication path 70, the power supply control circuitry 430 of the air conditioner 400 forcibly turns off the electric power of the power supplier 410.

As described above, in a case where a continuous communication interruption occurs over a period of time equal to or longer than the second threshold value T2 in the state in which the state of the power supply of the air conditioner 400 is in the on-state, the electric power of the air conditioner 400 is forced to be turned off. This makes it possible to prevent the air conditioner 400 from being used without making payment by abusing the communication interruption. After step S306, the forcible turning-off control circuitry 350 determines whether the state of the power supply of the air conditioner 400 changes from the off-state to the on-state, based on the result of monitoring the state of the power supply of the air conditioner 400 performed by the power state monitor 340 (step S307). The determination as to whether the air conditioner 400 is turned on is performed repeatedly, for example, at regular or irregular time intervals each equal to or shorter than the minimum charging time corresponding to the minimum unit in charging process. In a case where it is not determined that the state of the power supply of the air conditioner 400 has changed from the off-state to the on-state (NO in S307), the processing flow proceeds to step S309. On the other hand, in a case where it is determined that the state of the power supply of the air conditioner 400 has changed from the off-state to the on-state (YES in S307), the forcible turning-off control circuitry 350 transmits a forcibly turn-off command signal to the air conditioner 400 to forcibly turn off the electric power of the air conditioner 400 (step S308). When the air conditioner 400 receives this forcibly turn-off command signal via the wired communication path 70, the power supply control circuitry 430 of the air conditioner 400 forcibly turns off the electric power of the power supplier 410.

After step S308, the communication interruption detector 330 detects a normal wireless communication performed via the wireless communication path 60 (step S309). In a case where no normal wireless communication is detected (NO in S309), the processing flow returns to step S307. On the other hand, in a case where a normal wireless communication is detected (YES in S309), the processing flow returns to step S301. As described above, in a period from a detection of an occurrence of a continuous communication interruption for a period equal to or longer than the second threshold value T2 to a time at which a normal wireless communication is detected, even if a user tries to turn on the electric power of the air conditioner 400 by operating remote control circuitry or the like, the electric power of the air conditioner 400 is forcibly turned off. This makes it possible to prevent the air conditioner 400 from being used fraudulently without making payment by abusing the communication interruption.

Figure 9:
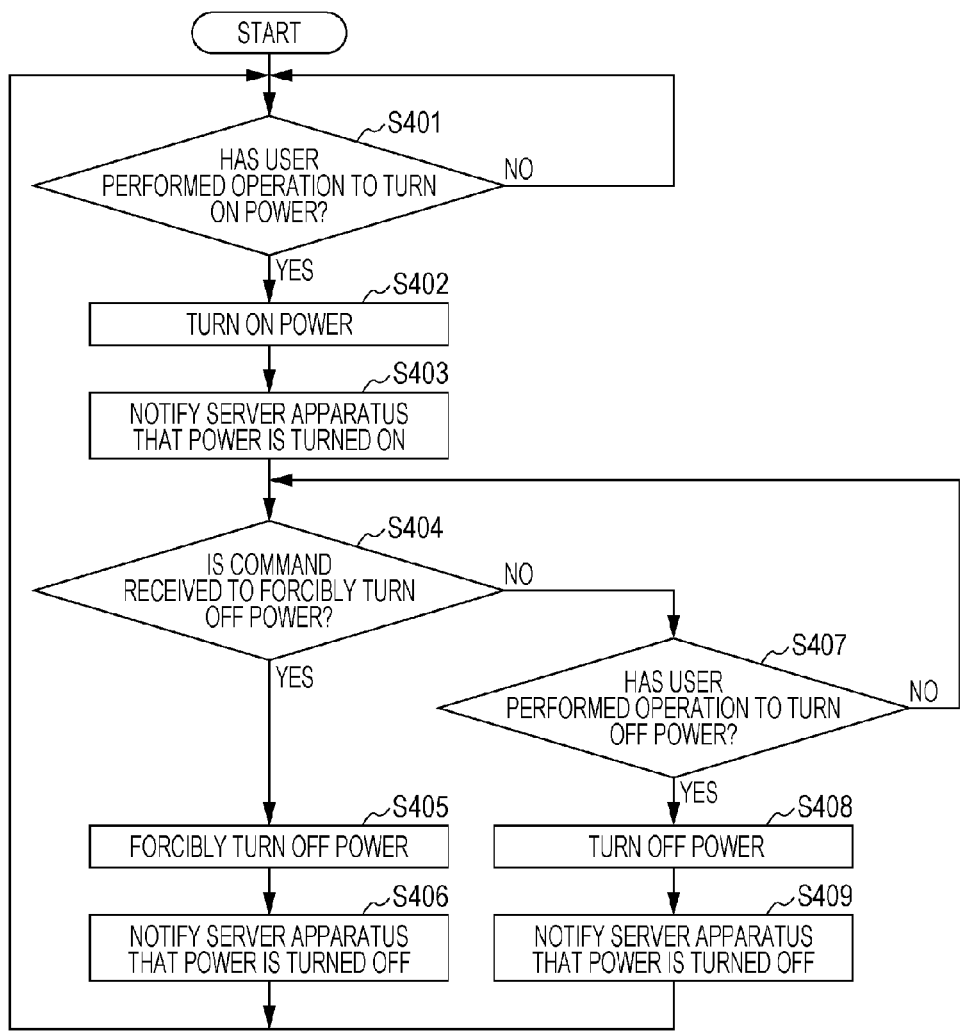
FIG. 9 is a flow chart of a power control process performed by an air conditioner illustrated in FIG. 2.

Next, a power control process performed by the air conditioner 400 illustrated in FIG. 2 is described below with reference to FIG. 9. FIG. 9 is a flow chart of the power control process performed by the air conditioner 400 illustrated in FIG. 2. In the air conditioner 400, the power supply control circuitry 430 determines whether a user performs an operation for turning on the electric power of the air conditioner 400 (step S401). In a case where it is not determined that a user has performed an operation for turning on the electric power of the air conditioner 400 (NO in S401), the power supply control circuitry 430 performs the process in step S401 repeatedly until it is determined that a user has performed an operation for turning on the electric power of the air conditioner 400. On the other hand, in a case where it is determined that a user has performed an operation for turning on the electric power of the air conditioner 400 (YES in S401), the power supply control circuitry 430 turns on the electric power of the power supplier 410 (step S402). The power supply control circuitry 430 then transmits a signal associated with power state information to the server 100 to notify the server 100 that the state of the power supply of the air conditioner 400 is in the on-state (step S403).

Thereafter, the power supply control circuitry 430 determines whether a forcibly turn-off command signal for forcibly turning off the electric power of the air conditioner 400 is received from the server 100 or the second communicator 300 (step S404). In a case where it is determined that no forcibly turn-off command signal is received (NO in S404), the processing flow proceeds to step S407. On the other hand, in a case where it is determined that the forcibly turn-off command signal is received (YES in S404), the power supply control circuitry 430 forcibly turns off the power supply of the power supplier 410 (step S405). The power supply control circuitry 430 transmits a signal associated with power state information to the server 100 to notify the server 100 that the state of the power supply of the air conditioner 400 is in the off-state (step S406). Thus, when the electric power of the air conditioner is forcibly turned off when the remaining usable amount in the account becomes zero, the server 100 is informed of this fact.

In step S407, the power supply control circuitry 430 determines whether a user performs an operation for turning on the electric power of the air conditioner 400 (step S407). In a case where it is determined that a user has not performed an operation for turning on the electric power of the air conditioner 400 (NO in S407), the processing flow returns to step S404. On the other hand, in a case where it is determined that a user has performed an operation for turning on the electric power of the air conditioner 400 (YES in S407), the power supply control circuitry 430 forcibly turns on the power supply of the power supplier 410 (step S408). The power supply control circuitry 430 then transmits a signal associated with power state information to the server 100 to notify the server 100 that the state of the power supply of the air conditioner 400 is in the off-state (step S409).

Figure 10:
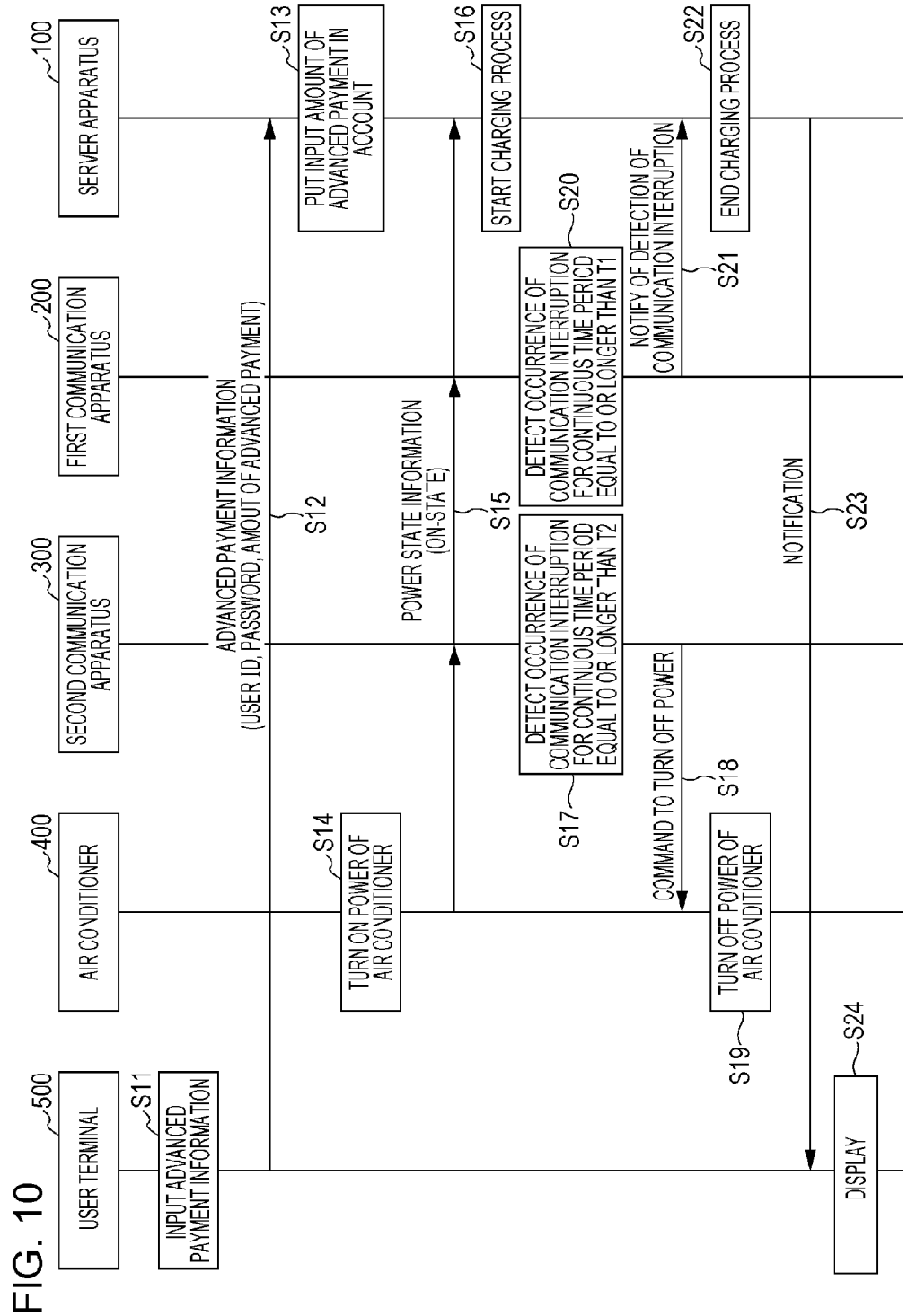
FIG. 10 is a sequence diagram illustrating an example of a system operation of a remote monitoring system illustrated in FIG. 2.

Next, an example of a system operation of the remote monitoring system 1 illustrated in FIG. 2 is described below with reference to FIG. 10. FIG. 10 is a sequence diagram illustrating an example of the system operation of the remote monitoring system 1 illustrated in FIG. 2. Note that the sequence diagram in FIG. 10 describes a sequence for an example case in which a communication interruption occurs in the wireless communication path between the first communicator 200 and the second communicator 300 in a state in which the electric power of the air conditioner is in the on-state.

A user performs inputting of advanced payment information using the user terminal 500 to input a user ID, a password, and an amount of advanced payment (step S11). In response, the user terminal 500 transmits advanced payment information to the server 100 (step S12). When the server 100 receives this advanced payment information, the server 100 adds the input amount of advanced payment to the current value in the accounting database 120 based on the advanced payment information (step S13). The advanced payment information includes, for example, a user ID, a password, an amount of advanced payment, and the like.

When the electric power of the air conditioner 400 is turned on by a user's operation (step S14), the air conditioner 400 transmits a signal associated with power state information to the server 100 to notify the server 100 that the state of the power supply of the air conditioner 400 is in the on-state (step S15). This signal arrives at the server 100 via the wired communication path 70, the second communicator 300 (the communicator 320, the wireless communicator 310), the wireless communication path 60, the first communicator 200 (the wireless communicator 220, the communicator 210), and the wired communication path 50. Thus the server 100 gets to recognize that the electric power of the air conditioner 400 has turned on, and starts the charging process if there is a remaining usable amount in the account of the user (step S16).

When the second communicator 300 detects an occurrence of a communication interruption over a continuous period of time equal to or longer than the second threshold value T2 (step S17), the second communicator 300 commands the air conditioner 400 to forcibly turn off the electric power (step S18). In accordance with this command, the air conditioner 400 forcibly turns off the electric power (step S19). If the first communicator 200 detects an occurrence of a communication interruption over a continuous period of time equal to or longer than the first threshold value T1 (step S20), the first communicator 200 notifies the server 100 of the detection of the communication interruption (step S21). In response to receiving the notification of the detection of the communication interruption, the server 100 ends the charging process (step S22). The server 100 notifies the user terminal 500 of a result of the charging process (step S23), and the user terminal 500 displays the result of the charging process (step S24).

Second Embodiment

A remote monitoring system according to a second embodiment is described below with reference to figures. In the second embodiment, constituent elements configured to perform substantially the same processes as those according to the first embodiment and those substantially same processes are denoted by similar reference numerals or symbols, and a further duplicated description thereof is omitted.

In the second embodiment, a method different from that according to the first embodiment is used to forcibly turn off the electric power of the air conditioner 400 over a period from a time at which the second communicator detects an occurrence of a communication interruption for a continuous period of time equal to or longer than the second threshold value T2 to a time at which a normal wireless communication is detected. More specifically, in this method, during the period from a time at which the second communicator detects an occurrence of a communication interruption for a continuous period of time equal to or longer than the second threshold value T2 to a time at which a normal wireless communication is detected, a forcibly turn-off command signal for forcibly turning off the electric power of the air conditioner 400 is transmitted to the air conditioner 400 repeatedly at regular or irregular time intervals.

Figure 11:
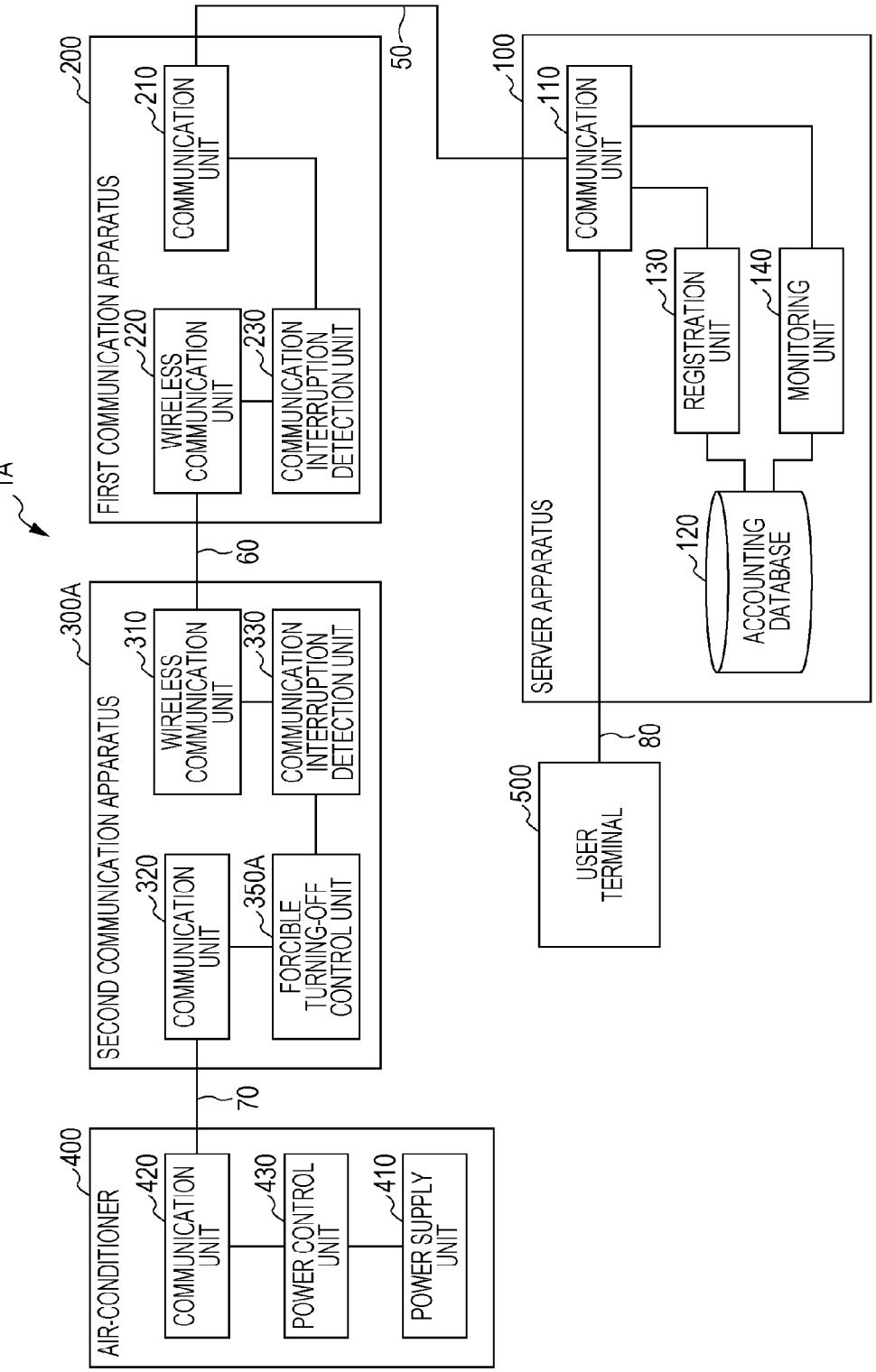
FIG. 11 is a block diagram illustrating details of a system configuration of a remote monitoring system according to a second embodiment.

FIG. 11 is a block diagram illustrating details of a system configuration of a remote monitoring system 1A according to the second embodiment. The remote monitoring system 1A is different from the remote monitoring system 1 illustrated in FIG. 2 in that the second communicator 300 is replaced with a second communicator 300A which does not have the power state monitor 340 and which has forcible turning-off control circuitry 350A instead of the forcible turning-off control circuitry 350.

The forcible turning-off control circuitry 350A is configured to operate such that when a notification of an occurrence of a communication interruption for a continuous period of time equal to or longer than the second threshold value T2 is received from the communication interruption detector 330, then a forcibly turn-off command signal for commanding the air conditioner 400 to forcibly turn off the electric power of the air conditioner 400 is output to the communicator 320. When the forcible turning-off control circuitry 350A receives, from the communication interruption detector 330, the notification of the occurrence of the continuous communication interruption over the period of time equal to or longer than the second threshold value T2, then the forcible turning-off control circuitry 350A outputs the forcibly turn-off command signal for commanding the air conditioner 400 to forcibly turn off the electric power of the air conditioner 400 to the communicator 320 repeatedly over a period from the reception of the notification of the interruption to a time at which a notification is received of a detection of an occurrence of a normal wireless communication. More specifically, for example, over the period described above, the forcible turning-off control circuitry 350 outputs the forcibly turn-off command signal to the communicator 320 repeatedly in regular or irregular time intervals each shorter than the minimum charging time corresponding to the minimum unit in charging process.

Figure 12:
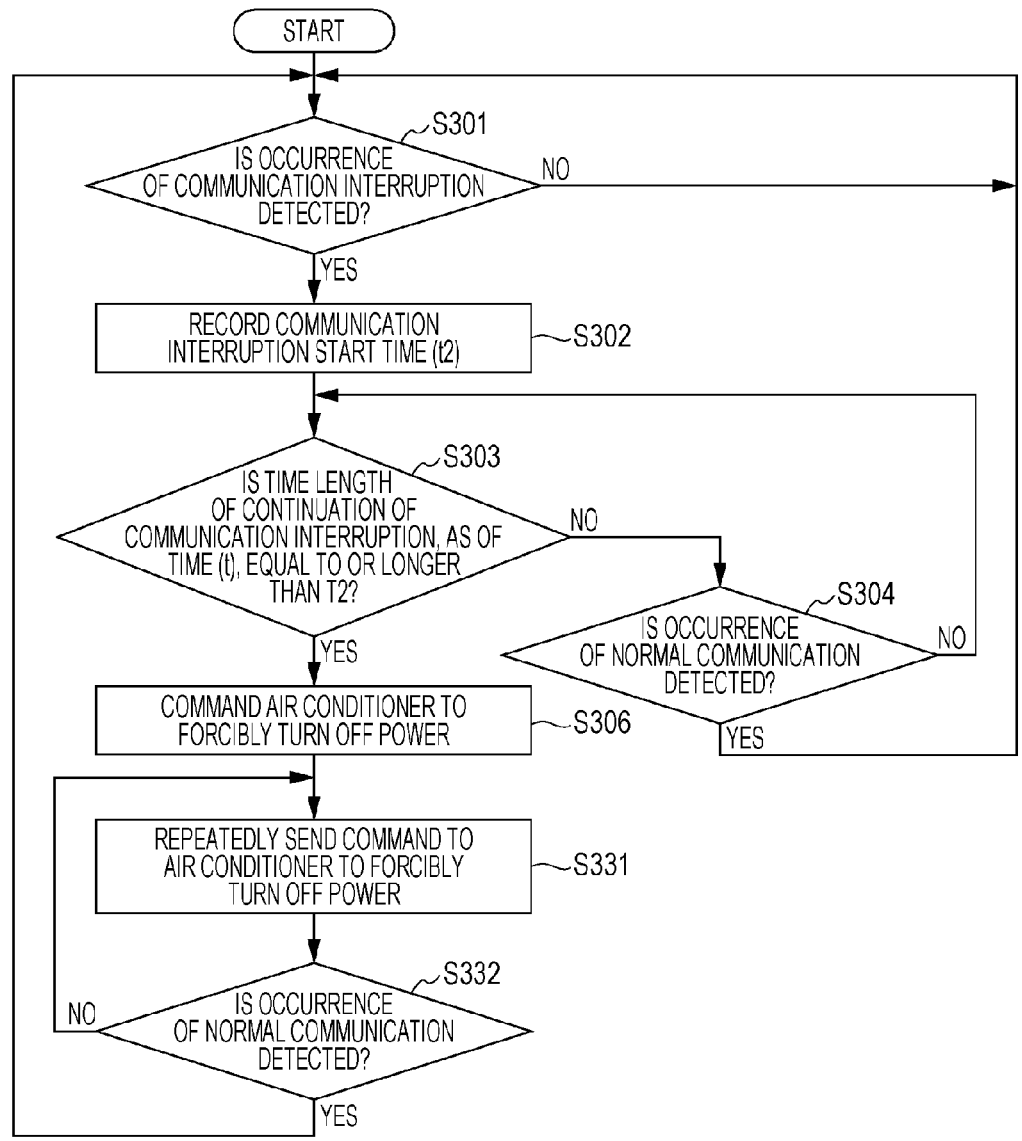
FIG. 12 is a flow chart of a process of detecting a communication interruption performed by a second communicator illustrated in FIG. 11.

Note that in the first embodiment described above, the power state monitor 340 is provided, and the forcibly turn-off command signal is transmitted only when the electric power of the air conditioner 400 is in the on-state. On the other hand, in the second embodiment, the power state monitor 340 is not provided, and the forcibly turn-off command signal is transmitted regardless of whether the electric power of the air conditioner 400 is in the on-state or off-state. FIG. 12 is a flow chart of the process of the communication interruption detection performed by the second communicator 300A illustrated in FIG. 11.

In the process performed by the second communicator 300A, steps from S301 to S304 are substantially the same as steps from S301 to S304 described above with reference to FIG. 8. In a case where the answer to step S303 is YES, the forcible turning-off control circuitry 350A transmits a forcibly turn-off command signal to the air conditioner 400 to forcibly turn off the electric power of the air conditioner 400 (step S306). In response to receiving the forcibly turn-off command signal, the power supply control circuitry 430 of the air conditioner 400 forcibly turns off the electric power of the power supplier 410 if the state of the power supply of the power supply of the air conditioner 400 is in the on-state. This makes it possible to prevent the air conditioner 400 from being used without making payment by abusing the communication interruption.

The forcible turning-off control circuitry 350A transmits the forcibly turn-off command signal for forcibly turning of the electric power of the air conditioner 400 repeatedly to the air conditioner 400 (step S331). The communication interruption detector 330 detects a normal wireless communication performed via the wireless communication path 60 (step S332). In a case where no normal wireless communication is detected (No in S332), the processing flow returns to step S331. On the other hand, in a case where a normal wireless communication is detected (YES in S332), the processing flow returns to step S301.

As described above, in a period from an prurience of a continuous communication interruption for a period of time equal to or longer than the second threshold value T2 to a detection of a normal wireless communication, even if a user tries to turn on the electric power of the air conditioner 400 by operating remote control circuitry or the like, the electric power of the air conditioner 400 is forced to be turned off. This makes it possible to prevent the air conditioner 400 from being used fraudulently without making payment by abusing the communication interruption. Note that in the method according to the second embodiment described above, the power state monitor 340 for monitoring the state of the power supply of the air conditioner 400 is not necessary.

Third Embodiment

A remote monitoring system according to a third embodiment is described below with reference to figures. In the third embodiment, constituent elements configured to perform substantially the same processes as those according to the first embodiment and those substantially same processes are denoted by similar reference numerals or symbols, and a further duplicated description thereof is omitted.

Figure 13:
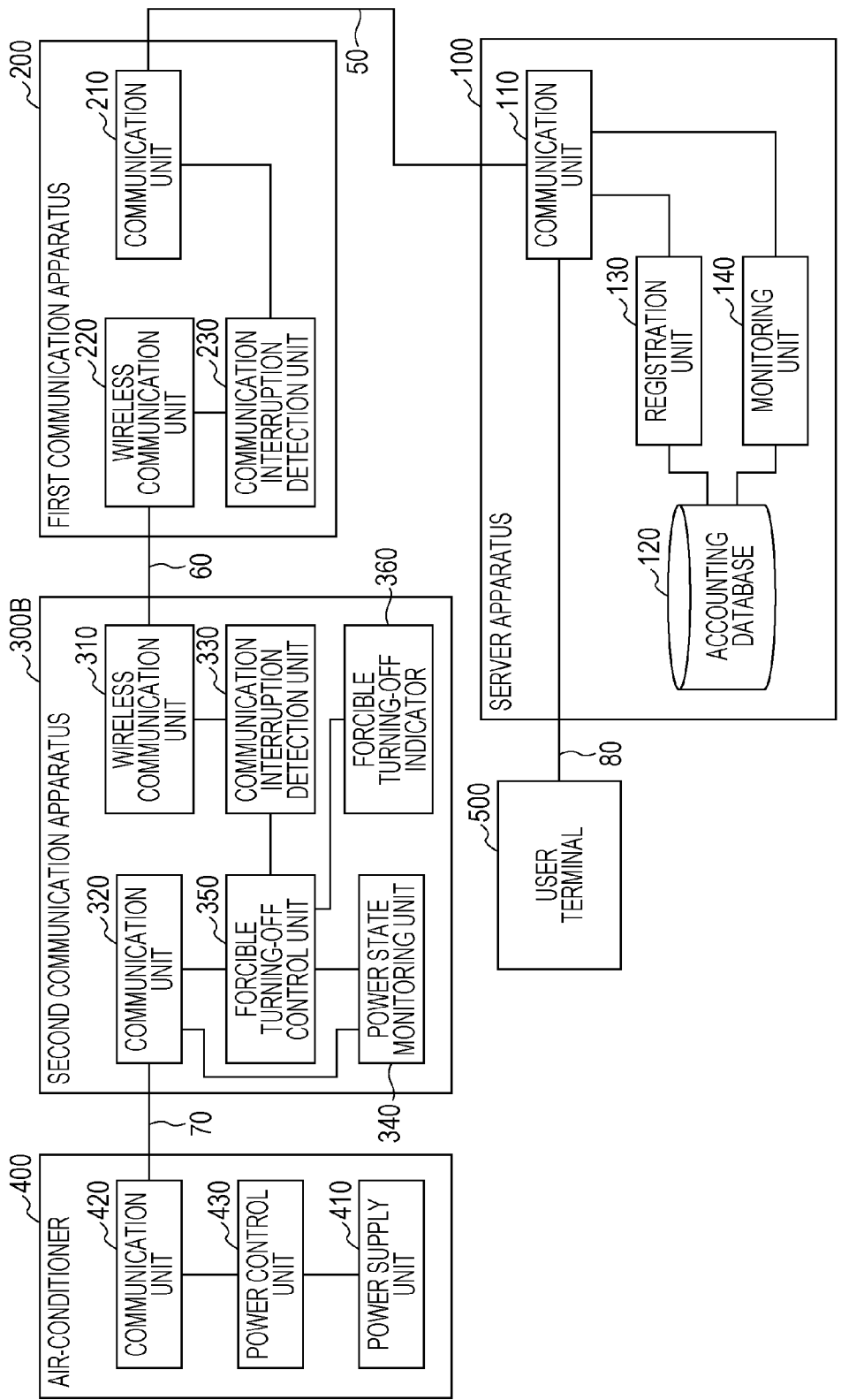
FIG. 13 is a block diagram illustrating details of a system configuration of a remote monitoring system according to a third embodiment.

In the remote monitoring system according to the third embodiment, when the electric power of the air conditioner is forcibly turned off, a user is informed of this fact. FIG. 13 is a block diagram illustrating a detailed configuration of a remote monitoring system according to the third embodiment. The remote monitoring system 1B includes as illustrated in FIG. 13, a second communicator 300B which is similar to the second communicator 300 according to the first embodiment except that the second communicator 300B additionally includes a forcible turning-off notifier 360. Note that each time the forcible turning-off control circuitry 350 issues a command to the air conditioner 400 to forcibly turn off the electric power of the air conditioner 400, the forcible turning-off control circuitry 350 notifies the forcible turning-off notifier 360 of this fact.

Figure 14A:
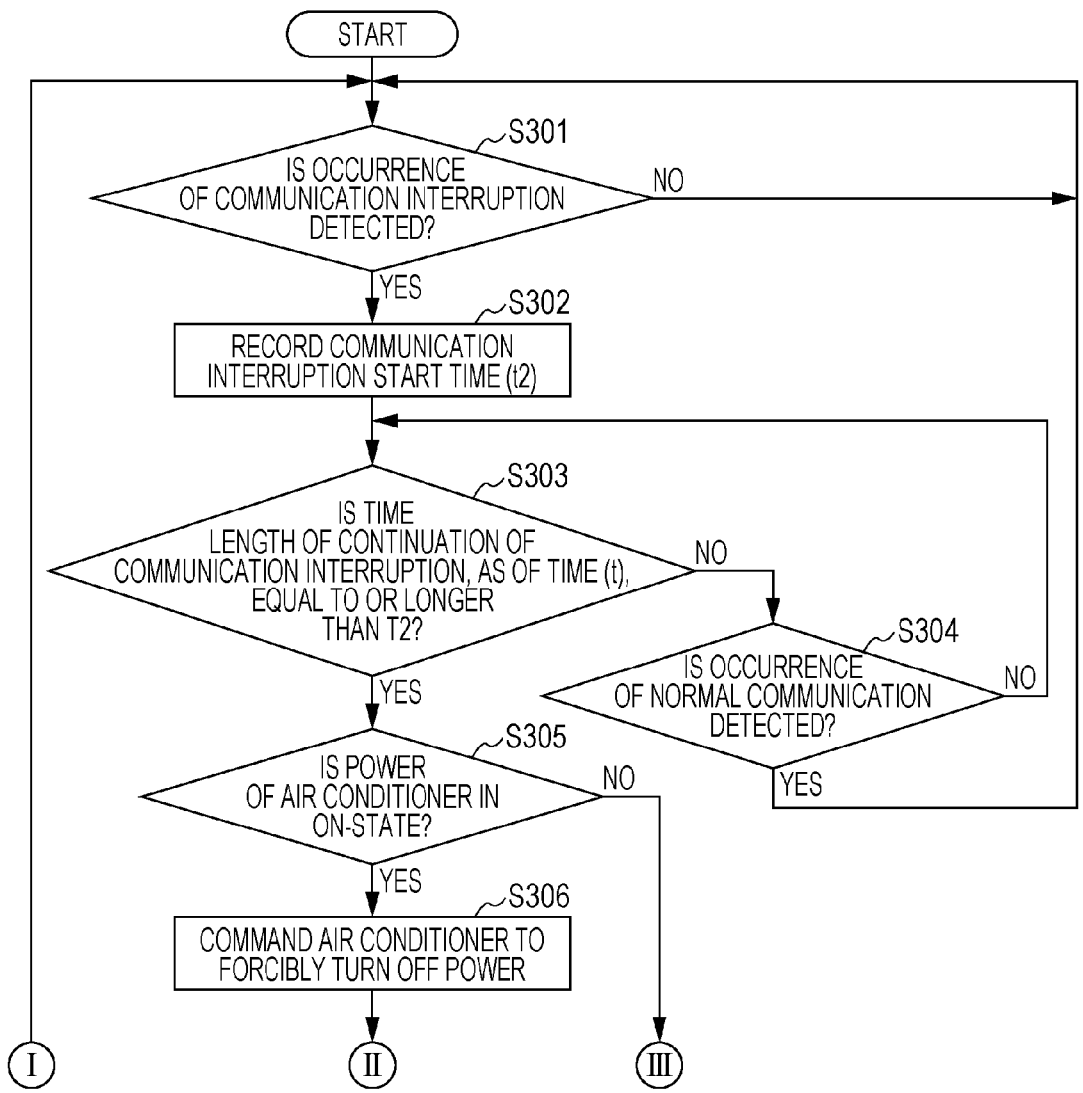
FIGS. 14A and 14B are flow charts of a process of detecting a communication interruption performed by a second communicator illustrated in FIG. 13.
Figure 14B:
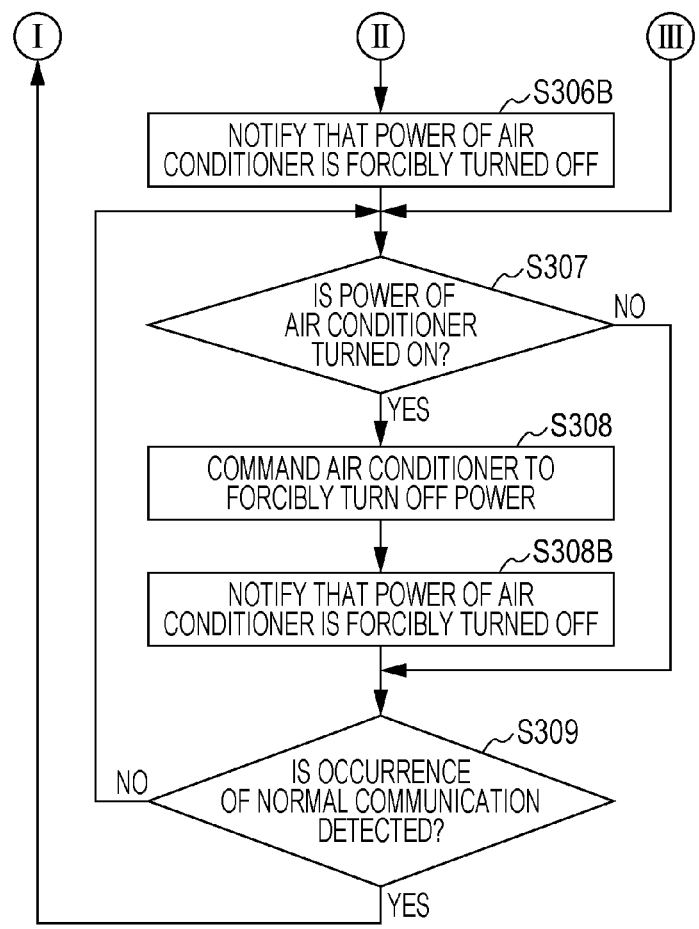

Each time the forcible turning-off notifier 360 receives, from the forcible turning-off control circuitry 350, the notification indicating that the command is issued to the air conditioner 400 to forcibly turn off the electric power of the air conditioner 400, the forcible turning-off notifier 360 notifies a user that the electric power of the air conditioner 400 is controlled to be forcibly turned off. More specifically, for example, the forcibly turning-off of the electric power of the air conditioner 400 may be notified by turning on or blinking a LED, generating a buzzer sound, or the like. FIGS. 14A and 14B are flow charts of the process of the communication interruption detection performed by the second communicator 300B illustrated in FIG. 13.

In the process performed by the second communicator 300B, steps from S301 to S306 are substantially the same as steps from S301 to S306 described above with reference to FIG. 8. Following step S306, the forcible turning-off notifier 360 performs a process to notify a user that the electric power of the air conditioner 400 is forcibly turned off (step S306B). This makes it possible for the user to get to recognize that the electric power of the air conditioner 400 is forced to be turned off.

In the process performed by the second communicator 300B, steps from S307 to S308 are substantially the same as steps from S307 to S308 described above with reference to FIG. 8. Following step S308, the forcible turning-off notifier 360 performs a process to notify a user that the electric power of the air conditioner 400 is forcibly turned off (step S308B). This makes it possible for the user to get to recognize that the electric power of the air conditioner 400 is forced to be turned off.

In the process performed by the second communicator 300B, step S309 is substantially the same as step S309 described above with reference to FIG. 8. When the electric power of the air conditioner 400 is forced to be turned off, a user may also be notified that the forcible tuning-off of the air conditioner 400 is caused by a communication interruption. Note that the function of notifying a user of the forcible turning-off of the electric power may be added to the second embodiment. In this case, for example, the forcible turning-off notifier 360 continuously notifies the user of the forcible turning-off of the electric power over a period from a determination of an prurience of a continuous communication interruption for a period of time equal to or longer than the second threshold value T2 to a detection of a normal wireless communication. More specifically, for example, the forcibly turning-off of the electric power of the air conditioner may be notified by turning on or blinking a LED, generating a buzzer sound, or the like.

Fourth Embodiment

A remote monitoring system according to a fourth embodiment is described below with reference to figures. In the fourth embodiment, constituent elements configured to perform substantially the same processes as those according to the first embodiment and those substantially same processes are denoted by similar reference numerals or symbols, and a further duplicated description thereof is omitted.

Figure 15:
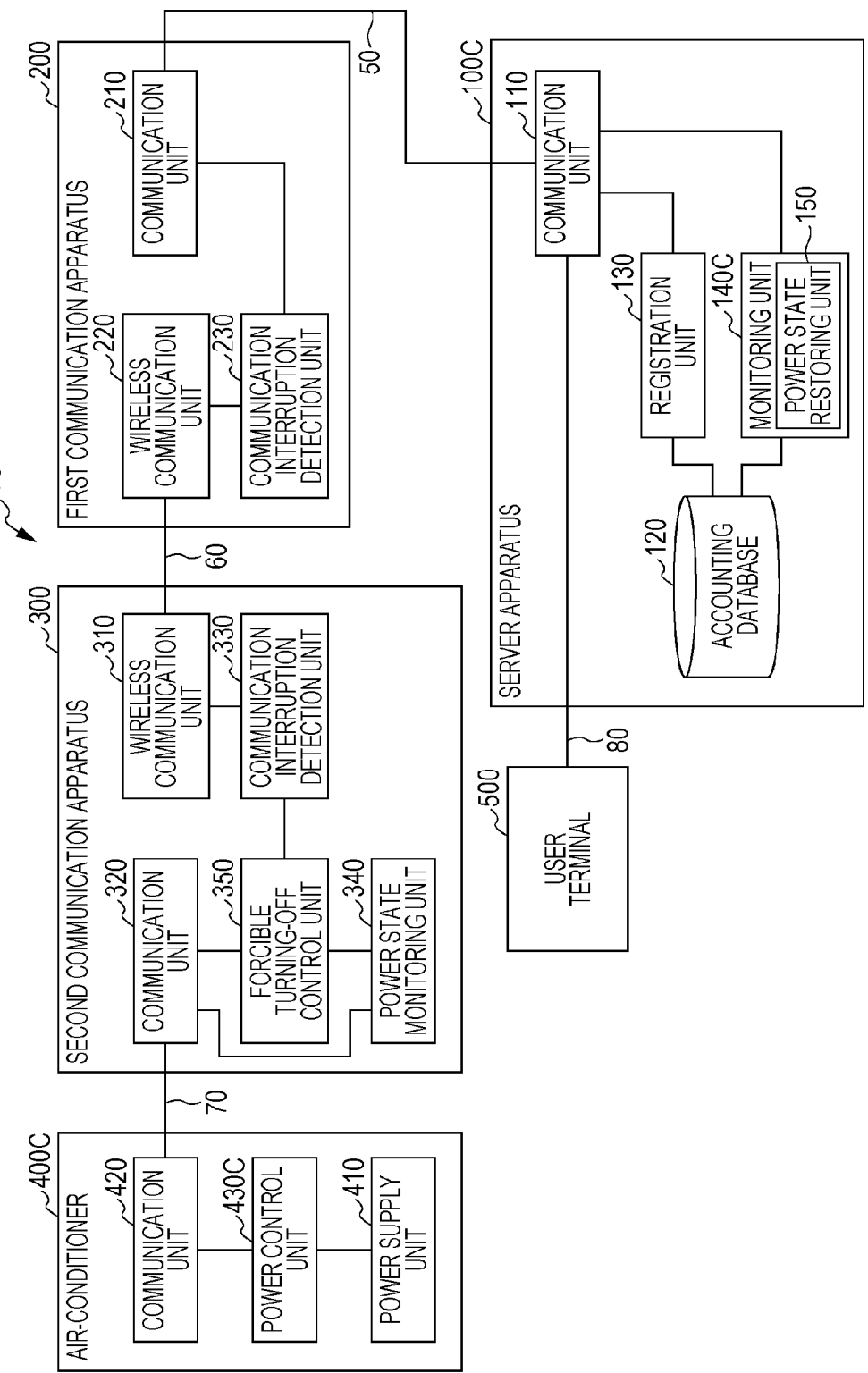
FIG. 15 is a block diagram illustrating details of a system configuration of a remote monitoring system according to a fourth embodiment.

In the remote monitoring system according to the fourth embodiment, in a case where a normal wireless communication is detected after a continuation of a communication interruption between the first communicator 200 and the second communicator 300 over a period of time equal to or longer than the first threshold value T1, the state of the power supply of the air conditioner is restored to a state in which the state of the power supply of the air conditioner was before the detection of the continuation of the communication interruption for the period of time equal to or longer than the first threshold value T1. FIG. 15 is a block diagram illustrating a detailed configuration of a remote monitoring system according to the fourth embodiment.

As illustrated in FIG. 15, the remote monitoring system 1C is configured by modifying the remote monitoring system 1 according to the first embodiment such that that the server 100 is replaced with a server 100C and the air conditioner 400 is replaced with an air conditioner 400C. The server 100C includes a monitor 140C configured by adding a function of a power state restorer 150 to the monitor 140 according to the first embodiment.

The power state restorer 150 holds a state in which the state of the power supply of the air conditioner 400C is before a detection of an occurrence of a continuous communication interruption over a period of time equal to or longer than the first threshold value T1. When a normal wireless communication is detected after a continuation of a communication interruption over a period of time equal to or longer than the first threshold value T1, if the state of the power supply of the air conditioner 400C was the on-state before the detection of the communication interruption, then the power state restorer 150 outputs a turn-on command signal for turning on the electric power of the air conditioner 400 to the communicator 110.

The air conditioner 400C is configured by modifying the air conditioner 400 according to the first embodiment such that the power supply control circuitry 430 is replaced with power supply control circuitry 430C. In addition to a similar function of performing the process to that of the power supply control circuitry 430 according to the first embodiment, the power supply control circuitry 430C further has a function of turning on the electric power of the power supplier 410 when the air conditioner 400C receives a turn-on command signal transmitted from the server 100C.

Figure 16:
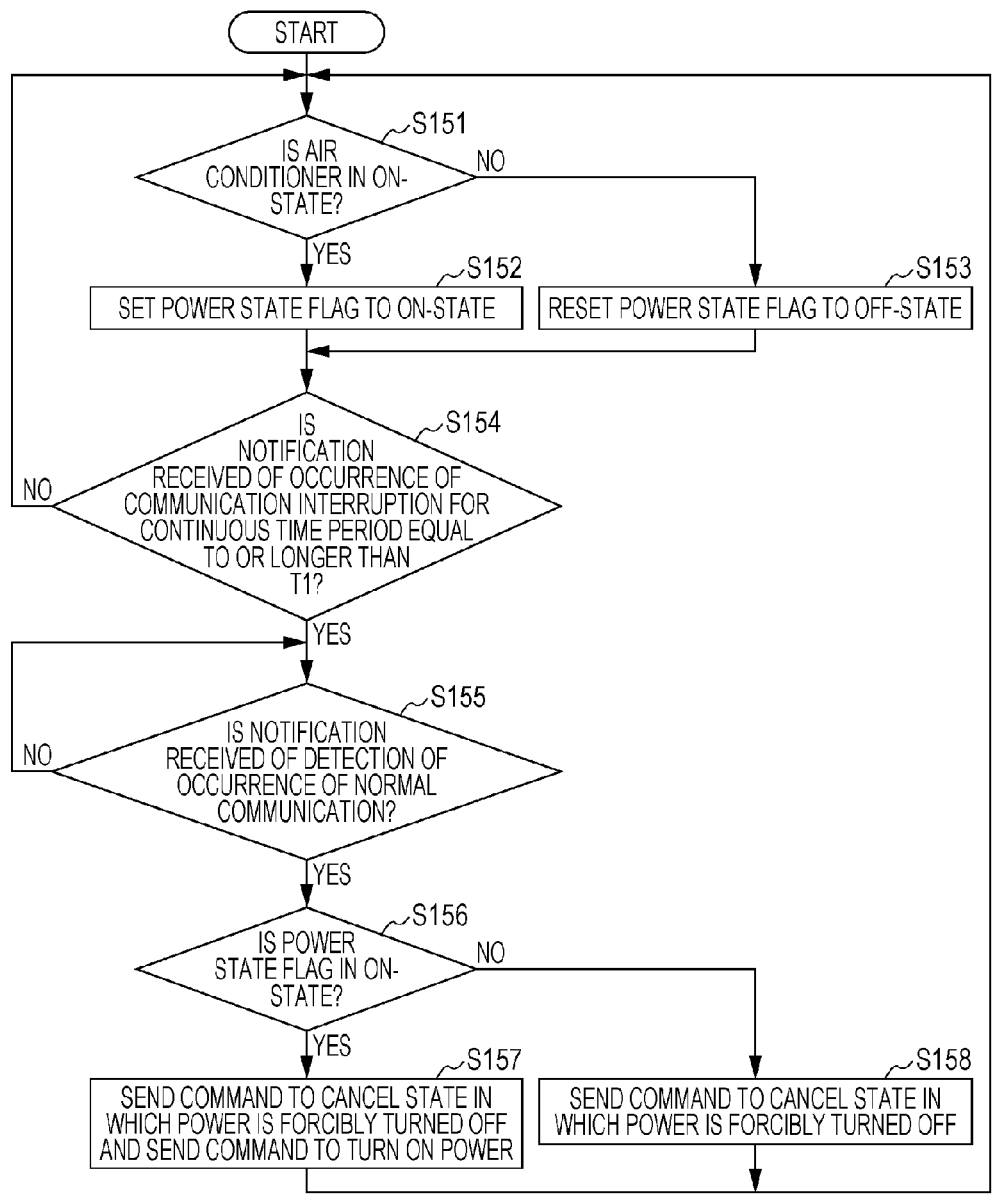
FIG. 16 is a flow chart of a process of restoring a power state of an air conditioner performed by a server illustrated in FIG. 15.

FIG. 16 is a flow chart of a process of restoring the state of the power supply of the air conditioner performed by a server 100C illustrated in FIG. 15. In the following description, it is assumed by way of example but not limitation that the state of the power supply of the air conditioner 400C is held in a state of the power supply flag. Note that the state of the power supply of the air conditioner 400C may be held in another way without using the power state flag. In the server 100C, the monitor 140C determines, based on power state information transmitted from the air conditioner 400C, whether the state of the power supply of the air conditioner 400C is in the off-state or the on-state (step S151). In a case where it is determined that the state of the power supply of the air conditioner 400C is in the on-state (YES in S151), the power state restorer 150 sets the power state flag to an on-state (step S152). On the other hand, in a case where it is determined that the state of the power supply of the air conditioner 400C is in the off-state (NO in S151), the power state restorer 150 resets the power state flag to an off-state (step S153).

The monitor 140 determines whether a communication interruption notification signal is received from the first communicator 200 wherein the communication interruption notification signal indicates an occurrence of a continuous communication interruption between the first communicator 200 and the second communicator 300 over a period of time equal to or longer than the first threshold value T1 (step S154). In a case where it is determined that the communication interruption notification signal is received (YES in S154), the processing flow proceeds to step S155. On the other hand, in a case where it is determined that the communication interruption notification signal is not received (NO in S154), the processing flow returns to step S151.

In step S155, the monitor 140C determines whether an end-of-communication-interruption notification signal is received from the first communicator 200 wherein the end-of-communication-interruption notification signal indicates that a normal wireless communication is detected after the continuous communication interruption for the period of time equal to or longer than the first threshold value T1 (step S155). In a case where it is determined that the end-of-communication-interruption notification signal is not received (NO in S155), the process in step S155 is repeated. In a case where it is determined that the end-of-communication-interruption notification signal is received (YES in S155), the monitor 140C determines whether the power state flag is in the on-state (step S156). In a case where it is determined that the power state flag is in the on-state (YES in S156), the power state restorer 150 transmits a forcible-turn-off release command signal for releasing the air conditioner 400C from the state in which the electric power of the air conditioner 400C is forcibly in the off-state, and a turn-on command signal for turning on the power supply of the air conditioner 400C to the second communicator 300. The second communicator 300 releases the air conditioner 400C from the state in which the electric power of the air conditioner 400C is forcibly in the off-state, and the second communicator 300 transmits the turn-on command signal to the air conditioner 400C (step S157). The turn-on command signal arrives at the air conditioner 400C via the wired communication path 50, the first communicator 200, the wireless communication path 60, the second communicator 300, and the wired communication path 70. In response, the power supply control circuitry 430C of the air conditioner 400C turns on the electric power of the power supplier 410. On the other hand, in a case where it is determined that the power state flag is in the off-state, (NO in S156), the power state restorer 150 transmits a forcible-turn-off release command signal to second communicator 300, which in turn releases the electric power from the state in which the power is forcibly in the off-state (step S158).

Note that the forcible-turn-off release command is a command, used in the first embodiment or the second embodiment, to cancel the forcible turn-off function which is a function of forcibly turning off the electric power of the air conditioner 400 over a period from a time at which the second communicator detects an occurrence of a communication interruption for a continuous period of time equal to or longer than the second threshold value T2 to a time at which a normal wireless communication is detected. This forcibly turn-off command signal makes it possible for the second communicator 300 and the air conditioner 400C to return to the state in which they were before the occurrence of the communication interruption.

Figure 17:
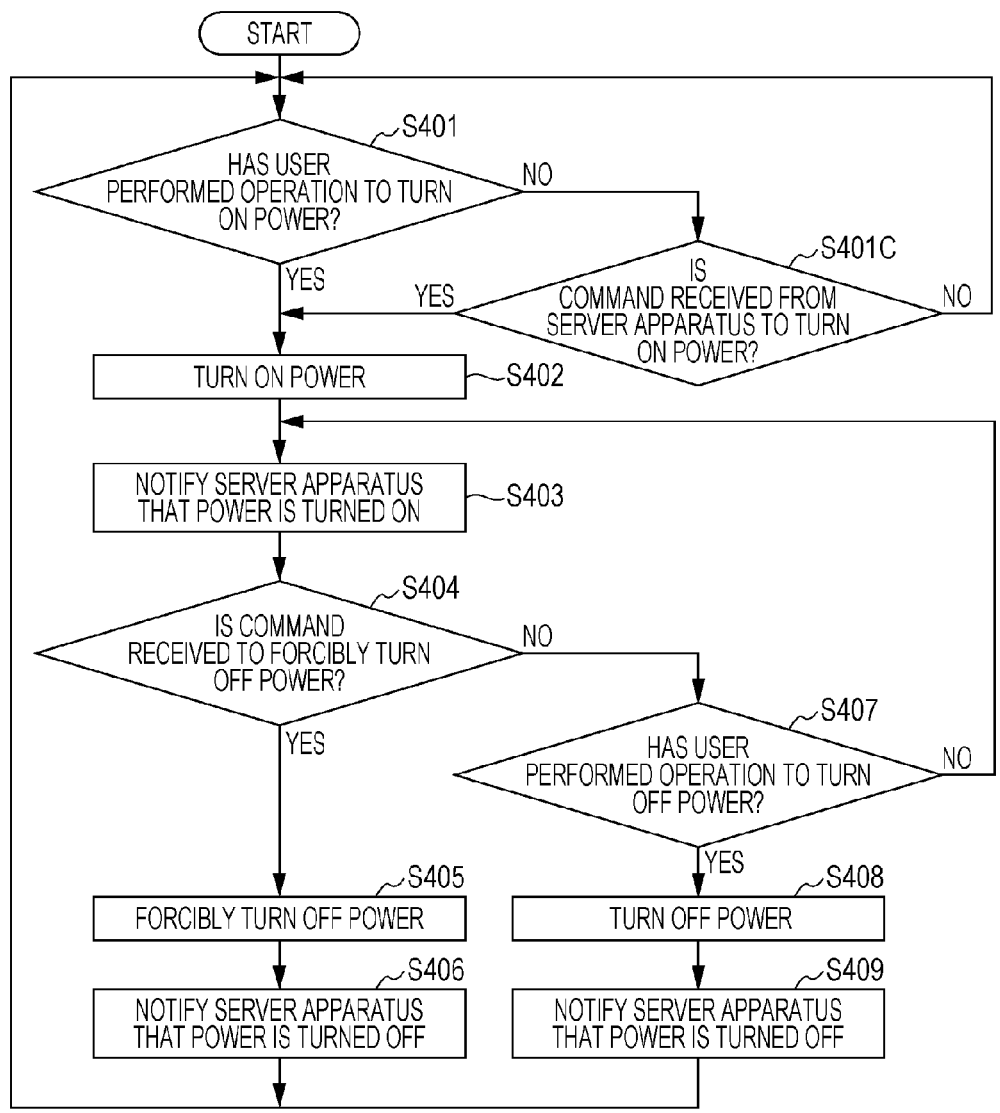
FIG. 17 is a flow chart of a power control process performed by an air conditioner illustrated in FIG. 2.

FIG. 17 is a flow chart of the power control process performed by the air conditioner 400C illustrated in FIG. 15. In the process performed by the air conditioner 400C, step S301 is substantially the same as step S301 described above with reference to FIG. 9. In a case where the answer to step S401 is NO, the power supply control circuitry 430C determines whether a turn-on command signal for turning on the power supply of the air conditioner 400C is received from the server 100C (step S401C). In a case where it is determined that the turn-on command signal is received (YES in S401C), the processing flow proceeds to step S402. On the other hand, in a case where it is determined that the turn-on command signal is not received, (NO in S401C), the processing flow returns to step S401.

In the process performed by the air conditioner 400C, steps from S402 to S409 are substantially the same as steps from S402 to S409 described above with reference to FIG. 9. In the fourth embodiment, in a case where a normal wireless communication is detected in the state in which the electric power of the air conditioner 400C is forcibly turned off in response to a communication interruption, the server 100C remotely controls the electric power of the air conditioner 400C to automatically turn on. This makes it unnecessary for a user to turn on the electric power of the air conditioner 400 each time the above-described situation occurs.

Note that instead of providing the power state restorer 150 in the server, a function similar to that of the power state restorer 150 may be added to the first communicator 200. Furthermore, instead of providing the power state restorer 150 in the server 100C, a function may be added to the second communicator 300 whereby when a normal wireless communication is detected after a continuation of a communication interruption between the first communicator 200 and the second communicator 300 over a period of time equal to or longer than the second threshold value T2, the state of the power supply of the air conditioner is restored to the state in which it was before the detection of the continuation of the communication interruption for the period of time equal to or longer than the second threshold value T2.

Fifth Embodiment

A remote monitoring system according to a fifth embodiment is described below with reference to figures. The fifth embodiment discloses a method for the first communicator 200 and the second communicator 300 to respectively detect an occurrence of a communication interruption in a wireless communication path between the first communicator and the second communicator.

In the following description, it is assumed by way of example that the first communicator 200 transmits a first communication interruption detection signal to the second communicator 300 repeatedly at regular or irregular time intervals. In a case where the second communicator 300 does not receive the first communication interruption detection signal within a predetermined period of time, the second communicator 300 determines that a communication interruption occurs, and thus it is possible for the second communicator 300 to detect an occurrence of a communication interruption. The transmission of the forcible-turn-off release command signal is performed at least once every predetermined period of time. Note that the predetermined period of time is set to be smaller than the second threshold value T2.

The second communicator 300 also transmits a second forcible-turn-off release command signal to the first communicator 200 repeatedly in regular or irregular time intervals. In a case where the first communicator 200 does not receive the second forcible-turn-off release command signal within a predetermined period of time, the first communicator 200 determines that a communication interruption occurs, and thus it is possible for the first communicator 200 to detect an occurrence of a communication interruption. The transmission of the second forcible-turn-off release command signal is performed at least once every predetermined period of time. Note that the predetermined period of time is set to be smaller than the first threshold value T1.

The first communication interruption detection signal and the second forcible-turn-off release command signal may be dedicated signals newly defined for use in detected communication interruptions, or may be existing signals. A method of detecting a communication interruption is described below for a case where a token method is used. In the token method, the first communicator transmits a "right" for token time to the second communicator thereby granting the right to use a channel for a particular short period of time. When the given token time expires, use of the communication channel is ended. The server transmits a new "right" for token time to the second transmitting apparatus. The communication is performed by performing the process described above repeatedly.

The second communicator requests the first communicator to provide a "right" for token time. In response, the first communicator transmits a "right" for token time to the second communicator. This transmission and reception process is performed repeatedly each time the second communicator spends a whole given token time. In a case where the first communicator does not receive a request for a next "right" for token time before a predetermined time of period has elapsed since a last reception of a request for a "right" for token time, the first communicator determines that a communication interruption has occurred.

Similarly, in a case where the second communicator does not receive a request for a next "right" for token time before a predetermined time of period has elapsed since a last reception of a "right" for token time or since the expiration of the given token time, the second communicator determines that a communication interruption has occurred.

Supplementary Description (1)

The present disclosure is not limited to details of the embodiments described above. The purpose of the present disclosure and related or associated purposes may be achieved in many other ways, for example, as follows.

(1) The remote monitoring system and the remote monitoring method according to any one of the first to fifth embodiments may be applied not only to the air conditioner but to a wide variety of other electrical apparatuses such as home electrical appliances (for example, a television set, a personal computer, and the like).

(2) The remote monitoring system and the remote monitoring method according to any one of the first to fifth embodiments may be applied not only to the apartment house but to a wide variety of other buildings comprising rooms in which an electrical apparatus is installed, such as a hotel, hospital, and the like.

(3) The remote monitoring system and the remote monitoring method according to any one of the first to fifth embodiments may be applied to a charging process for one or more electrical apparatuses.

(4) In the first to fifth embodiment, it is assumed by way of example but not limitation that the charging process is performed based on a prepaid method. Alternatively, a postpaid method may be employed.

(5) In the first to fifth embodiment, it is assumed by way of example but not limitation that the communication interruption detector 230 is disposed in the first communicator. Alternatively, the communication interruption detector 230 may be disposed in the server.

(6) Each constituent element of each apparatus in the remote monitoring system according to any one of the first to fifth embodiment may be realized using a large scale integration (LSI) which is a kind of an integrated circuit. In this case, each constituent element may be individually formed on one chip, or part or all constituent elements may be formed on one chip. The form of the integrated circuit is not limited to the LSI, but various other types of integrated circuits such as a system LSI, a super LSI, an ultra LSI, and the like may be employed. Furthermore, the integrated circuit may be realized in the form of a dedicated circuit, a general-purpose processor, or the like. The integrated circuit may also be realized using a field programmable gate array (FPGA), or a reconfigurable processor that allows it to reconfigure connections among circuit cells in the LSI or reconfigurable associated settings. When a new integration circuit technique other than LSI techniques are realized in the future by an advance in semiconductor technology or related technology, the functional blocks may be realized using such a new technique.

(7) At least part of the procedure of the operation of each apparatus in the remote monitoring system according to any one of the first to fifth embodiments may be described in a program, and the program may be stored in a memory. The program stored in the memory may be read out and executed, for example, by a central processor (CPU). The program may be stored in a storage medium and distributed.

(8) Elements, methods, processes, and related techniques disclosed in the first to fifth embodiments may be properly combined.

Supplementary Description (2)

The remote monitoring method and the remote monitoring system disclosed in the first to fifth embodiments and the supplementary description (1) are summarized below.

(1) A first aspect provides a remote monitoring method in a remote monitoring system including a first communicator connected to a server that performs a charging process depending on a state of a power supply of an electrical apparatus and a second communicator connected to the first communicator via a wireless communication network and that monitors the state of the power supply of the electrical apparatus, the remote monitoring method including making the server start the charging process associated with a user of the electrical apparatus by the first communicator in a case where the first communicator receives on-information, indicating the occurrence of a change of the electric power of the electrical apparatus from an off-state to an on-state, from the second communicator via the wireless communication network, making the server end the charging process by the first communicator in a case where after the first communicator makes the server start the charging process, the first communicator detects an occurrence of an interruption of the wireless communication between the first communicator and the second communicator, transmitting the on-information to the first communicator via the wireless communication network by the second communicator in a case where the second communicator detects the occurrence of the change of the electric power of the electrical apparatus from the off-state to the on-state, maintaining the electric power of the electrical apparatus in the on-state by the second communicator for a period in which the wireless communication between the second communicator and the first communicator continues, and changing the electric power of the electrical apparatus from the on-state to the off-state by the second communicator in a case where the second communicator detects the occurrence of an interruption of the wireless communication between the second communicator and the first communicator.

The remote monitoring method according to the first aspect described above makes it possible to perform the charging depending on use of the electrical apparatus of the user without using a prepaid card. This method prevents the electrical apparatus from being used without payment by making an interruption of wireless communication between the first communicator and the second communicator. Furthermore, this method allows it to perform the charging process depending on the state of the power supply of the electrical apparatus.

(2) A second aspect provides a remote monitoring method based on the first aspect, wherein in a case where the second communicator detects a change in the electric power of the electrical apparatus from the on-state to the off-state in a period in which the wireless communication between the second communicator and the first communicator continues, the second communicator transmits off-information indicating the occurrence of the change to the first communicator, and in a case where the first communicator receives the off-information from the second communicator in a period in which the wireless communication between the first communicator and the second communicator continues, the first communicator makes the server end the charging process.

(3) A third aspect provides a remote monitoring method based on the first aspect or the second aspect, wherein the first communicator determines whether an interruption time of the wireless communication elapsed since a start of the interruption of the wireless communication between the first communicator and the second communicator is equal to or longer than the first threshold value, and in a case where it is not determined that the interruption time is equal to or longer than the first threshold value, the first communicator makes the server continue the charging process, and in a case where it is determined that the interruption time is equal to or longer than the first threshold value, the first communicator makes the server end the charging process. The third aspect makes it possible to prevent the charging process from being stopped frequently.

(4) A fourth aspect provides a remote monitoring method based on one of the first to third aspects, wherein the second communicator determines whether an interruption time of the wireless communication elapsed since the start of the interruption of the wireless communication between the first communicator and the second wireless communication is equal to or longer than a second threshold value, and in a case where it is not determined that the interruption time is equal to or longer than the second threshold value, the second communicator maintains the electric power of the electrical apparatus in the on-state, and in a case where it is determined that the interruption time is equal to or longer than the second threshold value, the second communicator changes the electric power of the electrical apparatus from the on-state to the off-state. The fourth aspect makes it possible to prevent the electric power of the electrical apparatus from being forcibly turned off frequently.

(5) A fifth aspect provides a remote monitoring method based on the third aspect, wherein the first threshold value is a value greater than a mean value of duration time of wireless communication interruption that occur in a wireless communication in a normal operation state. The fifth aspect makes it possible to prevent the charging process from being stopped frequently.

(6) A sixth aspect provides a remote monitoring method based on the third aspect or the fifth aspect, wherein the first threshold value is a value smaller than a minimum charging time corresponding to a minimum unit in the charging process. The sixth aspect allows it to perform the charging process in minimum units before and after an occurrence of a communication interruption.

(7) A seventh aspect provides a remote monitoring method based on the fourth aspect, wherein the second threshold value is a value greater than a mean value of duration time of wireless communication interruptions that occur in wireless communication in a normal operation state. The seventh aspect makes it possible to prevent the electric power of the electrical apparatus from being forcibly turned off frequently.

(8) An eighth aspect provides a remote monitoring method based on the fourth aspect or the seventh aspect, wherein the second threshold value is a value smaller than a minimum charging time corresponding to a minimum unit in the charging process. The eighth aspect allows it to perform the charging process in minimum units before and after an occurrence of a communication interruption.

(9) A ninth aspect provides a remote monitoring method based on one of the first to eighth aspects, the electrical apparatus is an air-conditioning system, and wherein the server performs the charging process for a period in which an electric power of the air-conditioning system is in an on-state.

(10) A tenth aspect provides a remote monitoring system including a first communicator connected to a server that performs a charging process depending on a state of a power supply of an electrical apparatus and a second communicator connected to the first communicator via a wireless communication network and that monitors the state of the power supply of the electrical apparatus, wherein the first communicator makes the server start a charging process associated with a user of the electrical apparatus in a case where the first communicator receives on-information from the second communicator via the wireless communication network, and the first communicator makes the server end the charging process in a case where after the first communicator makes the server start the charging process, the first communicator detects an occurrence of an interruption of the wireless communication between the first communicator and the second communicator, and wherein the second communicator transmits on-information indicating the occurrence of the change to the first communicator via the wireless communication network in a case where the second communicator detects an occurrence of a change of the electric power of the electrical apparatus from an off-state to an on-state, and the second communicator maintains the electric power of the electrical apparatus in the on-state for a period in which the wireless communication between the second communicator and the first communicator continues, and the second communicator changes the electric power of the electrical apparatus from the on-state to the off-state in a case where the second communicator detects an occurrence of an interruption of the wireless communication between the second communicator and the first communicator.

The tenth aspect makes it possible to perform the charging depending on use of the electrical apparatus of the user without using a prepaid card. Furthermore it is possible to prevent the electrical apparatus from being used without payment by making an interruption of wireless communication between the first communication apparatus and the second communicator. Furthermore, it is allowed to perform the charging process depending on the state of the power supply of the electrical apparatus.

(11) An eleventh aspect provides a first communication apparatus connected to a server that performs a charging process depending on a state of the power supply of an electrical apparatus, the first communication apparatus including a wireless communicator connected to a second communicator that monitors the state of the power supply of the electrical apparatus, the wireless communicator that receives on-information indicating an occurrence of a change of the electric power of the electrical apparatus from an off-state to an on-state from the second communicator, a detector that detects a communication interruption in the wireless communication network, control circuitry that transmits a start signal for making the server start a charging process on the electrical apparatus in a case where the wireless communicator receives the on-information, and transmits an end signal for making the server end the charging process in a case where after the start signal is transmitted to the server, the detector detects an occurrence of an interruption of the wireless communication between the wireless communicator and the second communicator. The eleventh aspect makes it possible to perform the charging depending on use of the electrical apparatus of the user without using a prepaid card.

(12) A twelfth aspect provides a first communication apparatus based on the eleventh aspect, wherein in a case where the wireless communicator receives an off-information indicating an occurrence of a change of the electric power of the electrical apparatus from an on-state to an off-state in a period in which the wireless communication with the second communicator continues, the control circuitry transmits the end signal to the server.

(13) A thirteenth aspect provides a first communication apparatus based on the eleventh aspect or the twelfth aspect, wherein the control circuitry determines whether the wireless communication interruption time elapsed since the detection by the detector on the occurrence of the wireless communication interruption is equal to or longer than first threshold value, and in a case where it is not determined that the wireless communication interruption time is equal to or longer than the first threshold value, the control circuitry causes the server to continue the charging process without transmitting the end signal, and in a case where it is determined that the wireless communication interruption time is equal to or longer than the first threshold value, the control circuitry transmits the end signal to the server. The first communication apparatus according to the thirteenth aspect is capable of preventing the charging process from being stopped frequently.

(14) A second communication apparatus in a fourteenth aspect includes a wireless communicator that communicates with a first communicator connected to a server that performs a charging process depending on a state of the power supply of an electrical apparatus, a power monitor that monitors the state of the power supply of the electrical apparatus, and a power controller that controls the state of the power supply of the electrical apparatus, wherein the wireless communicator transmits to the first communicator on-information indicating the occurrence of the change thereby to cause the first communicator to make the server start the charging process associated with the electrical apparatus in a case where the power monitor detects an occurrence of a change in the electric power of the electrical apparatus from an off-state to an on-state, and wherein the power supply control circuitry maintains the electric power of the electrical apparatus in the on-state as long as the wireless communication between the wireless communicator and the first communicator and the power supply control circuitry changes the electric power of the electrical apparatus from the on-state to the off-state in a case where the wireless communicator detects an occurrence of an interruption of the wireless communication between the wireless communicator and the first communicator.

The fourteenth aspect makes it possible to perform the charging depending on use of the electrical apparatus of the user without using a prepaid card. This method prevents the electrical apparatus from being used fraudulently without payment by making an interruption of wireless communication between the first communicator and the second communicator. Furthermore, this method allows it to perform the charging process depending on the state of the power supply of the electrical apparatus.

(15) A fifteenth aspect provides a second communication apparatus based on the fourteenth aspect, wherein in a case where the power monitor detects an occurrence of a change of the state of the power supply of the electrical apparatus from the on-state to the off-state, the wireless communicator transmits to the first communicator off-information indicating the occurrence of the change thereby to cause the first communicator to make the server end the charging process associated with the electrical apparatus.

(16) A sixteenth aspect provides a communication apparatus based on the fourteenth aspect or the fifteenth aspect, wherein the wireless communicator determines whether the wireless communication interruption time elapsed since the detection of the occurrence of the wireless communication interruption is equal to or longer than second threshold value, and the power supply control circuitry causes the electric power of the electrical apparatus to maintain the power supply of the electrical apparatus in the on-state in a case where it is not determined that the interruption time is equal to or longer than second threshold value, and the power supply control circuitry changes the electric power of the electrical apparatus from the on-state to the off-state in a case where it is determined that the interruption time is equal to or longer than second threshold value. The sixteenth aspect makes it possible to prevent the electric power of the electrical apparatus from being forcibly turned off frequently.

(17) A seventeenth aspect provides a server apparatus that remotely monitors a state of the power supply of an electrical apparatus via a wireless communication network, the server including a communicator connected to a communication system including the wireless communication network, and a monitor that monitors the state of the power supply of the electrical apparatus via the wireless communication network and the communicator, wherein the monitor starts a charging process for use of the electrical apparatus in a case where the monitor detects an occurrence of a change of the state of the power supply of the electrical apparatus from an off-state to an on-state via the wireless communication network and the communicator, and the monitor continues the charging process over a period in which the detection via the wireless communication network and the communicator indicates that the state of the power supply of the electrical apparatus is in the on-state, and wherein the monitor ends the charging process when the monitor detects an occurrence of a change of the state of the power supply of the electrical apparatus from the on-state to the off-state via the wireless communication network and the communicator.

(18) An eighteenth aspect provides a remote monitoring method based on the first aspect, wherein in a case where the remaining usable amount of a user using the electrical apparatus becomes zero, the electric power of the electrical apparatus is turned off via the wireless communication network. The eighteenth aspect makes it possible to prevent the electrical apparatus from being used by a user in a state in which there is no remaining usable amount.

(19) A nineteenth aspect provides a remote monitoring method based on the fourth aspect, wherein in a case where an occurrence of a change of the state of the power supply of the electrical apparatus from the off-state to the on-state is detected in a period from a time at which a determination is made that the second communication interruption has continued for a period equal to or longer than the second threshold value to a time at which a normal wireless communication in the wireless communication path between the first communicator and the second communicator is detected, the electric power of the electrical apparatus is turned off.

In a period from a time at which the second communicator detects an occurrence of a second communication interruption for a continuous period of time equal to or longer than the second threshold value T2 to a time at which a normal wireless communication is detected, the server is not allowed to perform the charging. However, the remote monitoring method according to the nineteenth aspect is capable of preventing the electrical apparatus from being used in such a period thereby preventing a situation in which charging is not performed although the electrical apparatus is used.

(20) A twentieth aspect provides a remote monitoring method based on the third aspect, wherein the second communicator performs a process of turning off the electric power of the electrical apparatus repeatedly during a period from a time at which it is determined that the second communication interruption has continued for a period equal to or longer than the second threshold value to a time at which an occurrence of a normal wireless communication between the first communicator and the second communicator is detected.

In a period from a time at which the second communicator detects an occurrence of a second communication interruption for a continuous period of time equal to or longer than the second threshold value T2 to a time at which a normal wireless communication is detected, the server is not allowed to perform the charging. However, the remote monitoring method according to the twentieth aspect is capable of preventing the electrical apparatus from being used in such a period thereby preventing a situation in which charging is not performed although the electrical apparatus is used.

(21) A twenty first aspect provides a remote monitoring method based on one of the first, fourth, tenth, and fourteenth aspects, wherein in a case where the second communicator performs a process of turning off the electric power of the electrical apparatus, the second communicator notifies a user of this fact.

The twenty first aspect is capable of preventing a user from having a wrong idea that a failure occurs in the electrical apparatus when the electric power of the electrical apparatus is forcibly turned off.

(22) A twenty second aspect provides a remote monitoring method based on one of the third, fifth, sixth, and thirteenth aspects, wherein in a case where an occurrence of a normal wireless communication between the first communicator and the second communicator is detected after it is determined that the first communication interruption has continued for a period equal to or longer than the first threshold value, the server or the first communicator returns the state of the power supply of the electrical apparatus to a state in which the state of the power supply was before it is determined that the first communication interruption has continued for the period equal to or longer than the first threshold value.

The twenty second aspect makes it unnecessary for a user to perform an operation to turn on the electric power of the electrical apparatus, which results in a reduction in troublesomeness which otherwise user may have.

(23) A twenty third aspect provides a remote monitoring method based on one of the fourth, seventh, eighth, and sixteenth aspects, in a case where an occurrence of a normal wireless communication between the first communicator and the second communicator is detected after it is determined that the second communication interruption has continued for a period equal to or longer than the second threshold value, the second communicator returns the state of the power supply of the electrical apparatus to a state in which the state of the power supply was before it is determined that the second communication interruption has continued for the period equal to or longer than the second threshold value.

The twenty third aspect makes it unnecessary for a user to perform an operation to turn on the electric power of the electrical apparatus, which results in a reduction in troublesomeness which otherwise user may have.

(24) A twenty fourth aspect provides a remote monitoring method based on one of the first to eighth aspects or one of the tenth to twenty third aspects, the electrical apparatus is a home electrical appliance.

(25) A twenty fifth aspect provides a server apparatus based on the seventeenth aspect, wherein when the monitor ends the charging process, the monitor updates the charging information stored in the management table.

The twenty fifth aspect makes it possible to perform the charging depending on use of the electrical apparatus of the user without using a prepaid card.

(26) A twenty sixth aspect provides a server apparatus based on the seventeenth aspect, further including a communication interruption detector configured such that in a case where a communication interruption of a wireless communication in the wireless communication network is detected, the communication interruption detector determines whether the communication interruption has continued for a period of time equal to or longer than a predetermined value, wherein in a case where it is determined that the communication interruption has continued for a period of time equal to or longer than the predetermined value in a state in which the state of the power supply of the electrical apparatus is in the on-state, the monitor stops the charging process.

As described above, the techniques according to the present disclosure make it possible to perform a charging process depending on use of the electrical apparatus of the user without using a prepaid card in the manner that suppresses a possibility that the electrical apparatus is used without payment by interrupting wireless communication.

What is claimed is:

1. A remote monitoring method in a remote monitoring system comprising a first communicator connected to a server that performs a charging process, in which a fee is charged to a user of an electrical apparatus depending on a state of electric power supply to the electrical apparatus, and a second communicator connected to the first communicator via a wireless communication network and that monitors the state of the electric power supply to the electrical apparatus, the remote monitoring method comprising:

starting, by the first communicator, the charging process in the server, to charge the user of the electrical apparatus the fee, when the first communicator receives on-information from the second communicator via the wireless communication network, the on-information indicating that the electric power supply to the electrical apparatus is switched from an off-state to an on-state;

ending, by the first communicator, the charging process in the server, after the charging process is started, and when the first communicator detects an interruption of the wireless communication between the first communicator and the second communicator;

transmitting, by the second communicator, the on-information to the first communicator via the wireless communication network, when the second communicator detects that the electric power supply to the electrical apparatus is switched from the off-state to the on-state;

maintaining, by the second communicator, the electric power supply to the electrical apparatus in the on-state for a period in which the wireless communication between the second communicator and the first communicator continues; and switching, by the second communicator, the electric power supply to the electrical apparatus from the on-state to the off-state, when the second communicator detects an interruption of the wireless communication between the second communicator and the first communicator.

2. The remote monitoring method according to claim 1, wherein when the second communicator detects that the electric power supply to the electrical apparatus is switched from the on-state to the off-state in a period in which the wireless communication between the second communicator and the first communicator continues, the second communicator transmits off-information, indicating that the electric power supply to the electrical apparatus is switched from the on-state to the off-state, to the first communicator, and when the first communicator receives the off-information from the second communicator in a period in which the wireless communication between the first communicator and the second communicator continues, the first communicator ends the charging process in the server.

3. The remote monitoring method according to claim 1, wherein the first communicator determines whether an interruption time of the wireless communication elapsed since a start of the interruption of the wireless communication between the first communicator and the second communicator is equal to or longer than a first threshold value, and when it is not determined that the interruption time is equal to or longer than the first threshold value, the first communicator continues the charging process in the server, and when it is determined that the interruption time is equal to or longer than the first threshold value, the first communicator ends the charging process in the server.

4. The remote monitoring method according to claim 3, wherein the first threshold value is greater than a mean value of duration time of wireless communication interruptions that occur in a wireless communication in a normal operation state.

5. The remote monitoring method according to claim 3, wherein the first threshold value is smaller than a minimum charge time corresponding to a minimum unit in the charging process.

6. The remote monitoring method according to claim 1, wherein the second communicator determines whether an interruption time of the wireless communication elapsed since a start of the interruption of the wireless communication between the first communicator and the second wireless communicator is equal to or longer than a second threshold value, and when it is not determined that the interruption time is equal to or longer than the second threshold value, the second communicator maintains the electric power supply to the electrical apparatus in the on-state, and when it is determined that the interruption time is equal to or longer than the second threshold value, the second communicator switches the electric power supply to the electrical apparatus from the on-state to the off-state.

7. The remote monitoring method according to claim 6, wherein the second threshold value is greater than a mean value of duration time of wireless communication interruptions that occur in wireless communication in a normal operation state.

8. The remote monitoring method according to claim 6, wherein the second threshold value is smaller than a minimum charge time corresponding to a minimum unit in the charging process.

9. The remote monitoring method according to claim 1, wherein
the electrical apparatus is an air-conditioning system,
and wherein the server performs the charging process for a period in which an electric power supply to the air-conditioning system is in an on-state.

10. A remote monitoring system comprising a first communicator connected to a server that performs a charging process, in which a fee is charged to a user of an electrical apparatus depending on a state of electric power supply to the electrical apparatus, and a second communicator connected to the first communicator via a wireless communication network and that monitors the state of the electric power supply to the electrical apparatus,
wherein the first communicator starts a charging process in the server, to charge the user of the electrical apparatus the fee, when the first communicator receives on-information from the second communicator via the wireless communication network, and the first communicator ends the charging process in the server, after the charging process is started, and when the first communicator detects an interruption of the wireless communication between the first communicator and the second communicator, the on-information indicating that the electric power supply to the electrical apparatus is switched from an off-state to an on-state, and
wherein the second communicator transmits the on-information to the first communicator via the wireless communication network, when the second communicator detects that the electric power supply to the electrical apparatus is switched from an off-state to an on-state, and the second communicator maintains the electric power supply to the electrical apparatus in the on-state for a period in which the wireless communication between the second communicator and the first communicator continues, and the second communicator switches the electric power supply to the electrical apparatus from the on-state to the off-state, when the second communicator detects an interruption of the wireless communication between the second communicator and the first communicator.

11. A first communication apparatus connected to a server that performs a charging process, in which a fee is charged to a user of an electrical apparatus depending on a state of electric power supply to the electrical apparatus, the first communication apparatus comprising:
a wireless communicator connected to a second communicator that monitors the state of the electric power supply to the electrical apparatus, the wireless communicator receiving on-information from the second communicator via a wireless communication network, the on-information indicating that the electric power to the electrical apparatus is switched from an off-state to an on-state;
a detector that detects a communication interruption in the wireless communication network; and
control circuitry that transmits a start signal to the server to start the charging process in the server, to charge the user of the electrical apparatus the fee, when the wireless communicator receives the on-information, and transmits an end signal to the server to end the charging process in the server, after the start signal is transmitted to the server, and when the detector detects an interruption of the wireless communication between the wireless communicator and the second communicator.

12. The first communication apparatus according to claim 11, wherein when the wireless communicator receives an off-information, indicating that the electric power supply to the electrical apparatus is switched from an on-state to an off-state, in a period in which the wireless communication with the second communicator continues, the control circuitry transmits the end signal to the server.

13. The first communication apparatus according to claim 11, wherein the control circuitry determines whether the wireless communication interruption time elapsed since the detector detects the interruption of the wireless communication, is equal to or longer than a first threshold value, and
when it is not determined that the wireless communication interruption time is equal to or longer than the first threshold value, the control circuitry continues the charging process in the server without transmitting the end signal, and
when it is determined that the wireless communication interruption time is equal to or longer than the first threshold value, the control circuitry transmits the end signal to the server.

14. A second communication apparatus comprising:
a wireless communicator that communicates with a first communicator connected to a server that performs a charging process, in which a fee is charged to a user of an electrical apparatus depending on a state of electric power supply to the electrical apparatus;
a power monitor that monitors the state of the electric power supply to the electrical apparatus; and
power supply control circuitry that controls the state of the electric power supply to the electrical apparatus,
wherein, when the power monitor detects that the electric power supply to the electrical apparatus is switched from an off-state to an on-state, the wireless communicator transmits, to the first communicator, on-information indicating that the electric power supply to the electrical apparatus is switched from the off-state to the on-state, the on-information causing the first communicator to start the charging process in the server, to charge the user of the electrical apparatus the fee, and
wherein the power supply control circuitry maintains the electric power supply to the electrical apparatus in the on-state for a period in which the wireless communication between the wireless communicator and the first communicator continues, and the power supply control circuitry switches the electric power supply to the electrical apparatus from the on-state to the off-state, when the wireless communicator detects an interruption of the wireless communication between the wireless communicator and the first communicator.

15. The second communication apparatus according to claim 14, wherein when the power monitor detects that the electric power supply to the electrical apparatus is switched from the on-state to the off-state, the wireless communicator transmits, to the first communicator, off-information, indicating that the electric power supply to the electrical apparatus is switched from the on-state to the off-state, to cause the first communicator end the charging process in the server associated with the electrical apparatus.

16. The second communication apparatus according to claim 14, wherein the wireless communicator determines whether a wireless communication interruption time elapsed since the interruption of the wireless communication is detected, is equal to or longer than second threshold value, and the power supply control circuitry maintains the electric power supply to the electrical apparatus in the on-state, when it is not determined that the wireless communication interruption time is equal to or longer than second threshold value, and the power supply control circuitry switches the electric power supply to the electrical apparatus from the on-state to the off-state, when it is determined that the wireless communication interruption time is equal to or longer than second threshold value.

17. A server apparatus that remotely monitors a state of electric power supply to an electrical apparatus via a wireless communication network, the server comprising:

a communicator connected to a communication system including the wireless communication network; and a monitor that monitors the state of the electric power supply to the electrical apparatus via the wireless communication network and the communicator, wherein the monitor starts a charging process, in which a fee is charged to a user of an electrical apparatus depending on the state of the electric power supply to the electrical apparatus, when the monitor detects that the electric power supply to the electrical apparatus is switched from an off-state to an on-state via the wireless communication network and the communicator, and the monitor continues the charging process for a period in which the monitor detects, via the wireless communication network and the communicator, that the electric power supply to the electrical apparatus is in the on-state, and the monitor ends the charging process when the monitor detects that the electric power supply to the electrical apparatus is switched from the on-state to the off-state via the wireless communication network and the communicator.

* * * * *